United States Patent
Park et al.

(10) Patent No.: US 11,700,370 B2
(45) Date of Patent: Jul. 11, 2023

(54) VIDEO ENCODING METHOD AND ENCODING DEVICE, AND VIDEO DECODING METHOD AND DECODING DEVICE CONSIDERING HARDWARE DESIGN

(71) Applicant: SAMSUNG ELECTRONICS CO., LTD., Suwon-si (KR)

(72) Inventors: Minwoo Park, Suwon-si (KR); Minsoo Park, Suwon-si (KR); Anish Tamse, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/272,110

(22) PCT Filed: Aug. 28, 2019

(86) PCT No.: PCT/KR2019/011026
§ 371 (c)(1),
(2) Date: Feb. 26, 2021

(87) PCT Pub. No.: WO2020/045998
PCT Pub. Date: Mar. 5, 2020

(65) Prior Publication Data
US 2021/0321099 A1 Oct. 14, 2021

Related U.S. Application Data

(60) Provisional application No. 62/783,584, filed on Dec. 21, 2018, provisional application No. 62/754,848, (Continued)

(51) Int. Cl.
H04N 19/119 (2014.01)
H04N 19/174 (2014.01)
(Continued)

(52) U.S. Cl.
CPC ......... *H04N 19/119* (2014.11); *H04N 19/174* (2014.11); *H04N 19/176* (2014.11);
(Continued)

(58) Field of Classification Search
CPC .... H04N 19/119; H04N 19/174; H04N 19/60; H04N 19/176; H04N 19/186; H04N 19/42
See application file for complete search history.

(56) References Cited

U.S. PATENT DOCUMENTS

2017/0347128 A1 11/2017 Panusopone et al.
2019/0052876 A1 2/2019 Lee et al.
(Continued)

FOREIGN PATENT DOCUMENTS

KR 10-2018-0085526 A 7/2018
WO 2017/138791 A1 8/2017
WO 2017/157249 A1 9/2017

OTHER PUBLICATIONS

International Preliminary Report on Patentability in International Application No. PCT/KR2019/011026, dated Dec. 22, 2020.
(Continued)

*Primary Examiner* — Tat C Chio
(74) *Attorney, Agent, or Firm* — Sughrue Mion, PLLC

(57) ABSTRACT

Provided is a video decoding method including: generating coding units by splitting at least one of a height and a width of a largest coding unit having a first size; based on whether a height or a width of a non-square first coding unit including an outer boundary of an image, among the coding units, is greater than a maximum transform size, determining whether it is allowed to generate two second coding units by splitting at least one of the height and the width of the first coding unit; and decoding the second coding units generated from the first coding unit.

3 Claims, 30 Drawing Sheets

Related U.S. Application Data filed on Nov. 2, 2018, provisional application No. 62/723,584, filed on Aug. 28, 2018.

(51) Int. Cl.
　　*H04N 19/176*　　(2014.01)
　　*H04N 19/186*　　(2014.01)
　　*H04N 19/60*　　(2014.01)
　　*H04N 19/42*　　(2014.01)

(52) U.S. Cl.
　　CPC .......... *H04N 19/186* (2014.11); *H04N 19/60* (2014.11); *H04N 19/42* (2014.11)

(56) References Cited

U.S. PATENT DOCUMENTS

| | | | |
|---|---|---|---|
| 2019/0098305 A1* | 3/2019 | Fu | H04N 19/70 |
| 2021/0037266 A1* | 2/2021 | Nam | H04N 19/463 |
| 2021/0136423 A1* | 5/2021 | Chen | H04N 19/96 |

OTHER PUBLICATIONS

International Search Report (PCT/ISA/210) issued by the International Searching Authority in International Application No. PCT/KR2019/011026, dated Nov. 29, 2019.

Jackie Ma et al., "Description of Core Experiment: Partitioning", Joint Video Exploration Team (JVET) of ITU-T SG 16 WP 3 and ISO/IEC JTC 1/SC 29/WG 11.JVET-J1021_r5, Apr. 20, 2018, 10th Meeting. San Diego, US, pp. 1-33 (33 pages total).

Communication dated Mar. 11, 2021, issued by the Korean Intellectual Property Office in Korean Application No. 10-2020-7031940.

Wei Li et al., "CU splitting on frame boundary for arbitrary resolution video in HEVC", Advanced Engineering Forum, ISSN: 2234-911X, Sep. 9, 2011, vol. 1, pp. 116-120 (5 pages total).

Communication dated Apr. 25, 2022, issued by the European Patent Office in counterpart European Application No. 19855159.0.

Hsu et al., "CE1-related: Constraint for binary and ternary partitions," Joint Video Experts Team (JVET) of ITU-T SG 16 WP 3 and ISO/IEC JTC 1/SC 29/WG 11, JVET-K0556-v2, Jul. 16, 2018, XP030199974, Total 3 pages.

Bross, "Versatile Video Coding (Draft 1)," Joint Video Experts Team (JVET) of ITU-T SG 16 WP 3 and ISO/IEC JTC 1/SC 29/WG 11, JVET-J1001-v2, Jun. 15, 2018, XP30198633, Total 40 pages.

Chen et al., "Algorithm description for Versatile Video Coding and Test Model 1 (VTM 1)," Joint Video Experts Team (JVET) of ITU-T SG 16 WP 3 and ISO/IEC JTC 1/SC 29/WG 11, JVET-J1002-v1, May 9, 2018, XP030151306, Total 7 pages.

Bross et al., "Versatile Video Coding (Draft 2)," Joint Video Experts Team (JVET) of ITU-T SG 16 WP 3 and ISO/IEC JTC 1/SC 29/WG 11, JVET-K1001-v1, Jul. 27, 2018, XP030193508, Total 41 pages.

Park et al., "CE1-related: Split Constraint Considering Picture Boundary Condition," Joint Video Experts Team (JVET) of ITU-T SG 16 WP 3 and ISO/IEC JTC 1/SC 29/WG 11,JVET-L0050-v1, Oct. 4, 2018, XP030194600, Total 10 pages.

Tsai et al., "CE1-related: Picture boundary CU split satisfying the VPDU constraint," Joint Video Experts Team (JVET) of ITU-T SG 16 WP 3 and ISO/IEC JTC 1/SC 29/WG 11, JVET-M0888-v3, Jan. 17, 2019, XP030254335, Total 6 pages.

Indian Office Action, dated Nov. 25, 2022, issued by the Intellectual Property India, Application No. 202147006927.

* cited by examiner

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 29

```
bool CU::onPipelineBoundary(const UnitArea& area, const Picture& pic)
{
  int result = false;
  int x = area.lx();
  int y = area.ly();
  int w = area.lwidth();
  int h = area.lheight();
  int pic_w = pic.lwidth();
  int pic_h = pic.lheight();
  int left_pipeline_boundary = x - (x % 64);
  if (left_pipeline_boundary + 64 < x + w)
  {
    result = true;
  }
  int top_pipeline_boundary = y - (y % 64);
  if (top_pipeline_boundary + 64 < y + h)
  {
    result = true;
  }
  if (w == 128 && h == 128)
  {
    result = false;
  }
  if (w == 64 && h == 128 && (w % 64)==0)
  {
    result = false;
  }
  if (h == 64 && w == 128 && (h % 64)==0)
  {
    result = false;
  }
  if ((x + 128) > pic_w || (y + 128) > pic_h)
  {
    result = false;
  }
  return result;
}
```

FIG. 30

| seq_parameter_set_rbsp() { | Descriptor |
|---|---|
| sps_seq_parameter_set_id | ue(v) |
| chroma_format_idc | ue(v) |
| if( chroma_format_idc==3 ) | |
|    separate_colour_plane_flag | u(1) |
| pic_width_in_luma_samples | ue(v) |
| pic_height_in_luma_samples | ue(v) |
| bit_depth_luma_minus8 | ue(v) |
| bit_depth_chroma_minus8 | ue(v) |
| qtbtt_dual_tree_intra_flag | ue(v) |
| qtbtt_dual_tree_inter_flag | ue(v) |
| log2_ctu_size_minus2 | ue(v) |
| log2_min_qt_size_intra_slices_minus2 | ue(v) |
| log2_min_qt_size_inter_slices_minus2 | ue(v) |
| log2_diff_ctu_max_bt_size_intra | ue(v) |
| log2_diff_ctu_max_tt_size_intra | ue(v) |
| if(qtbtt_dual_tree_intra_flag) { | |
|    log2_diff_ctu_max_bt_size_chroma_intra | ue(v) |
|    log2_diff_ctu_max_tt_size_chroma_intra | ue(v) |
| } | |
| log2_diff_ctu_max_bt_size_inter | ue(v) |
| log2_diff_ctu_max_tt_size_inter | ue(v) |
| if(qtbtt_dual_tree_inter_flag) { | |
|    log2_diff_ctu_max_bt_size_chroma_inter | ue(v) |
|    log2_diff_ctu_max_tt_size_chroma_inter | ue(v) |
| } | |
| max_mtt_hierarchy_depth_inter_slices | ue(v) |
| max_mtt_hierarchy_depth_intra_slices | ue(v) |
| sps_cclm_enabled_flag | ue(1) |
| sps_mts_intra_enabled_flag | ue(1) |
| sps_mts_inter_enabled_flag | ue(1) |
| rbsp_trailing_bits() | |
| } | |

VIDEO ENCODING METHOD AND ENCODING DEVICE, AND VIDEO DECODING METHOD AND DECODING DEVICE CONSIDERING HARDWARE DESIGN

TECHNICAL FIELD

A method and apparatus according to an embodiment may encode or decode an image by using coding units with various shapes included in the image.

BACKGROUND ART

With the development and spread of hardware capable of reproducing and storing high-resolution or high-definition image content, the need for a codec that effectively encodes or decodes high-resolution or high-definition image content has increased. Encoded image content may be decoded and then reproduced. Recently, methods of effectively compressing such high-resolution or high-definition image content are being used. For example, methods for efficiently implementing image compression through a process of splitting images to be encoded by an arbitrary method have been implemented.

Various data units may be used to compress images, and there may be an inclusion relationship between such data units. In order to determine a size of a data unit to be used for image compression, a data unit may be split by using various methods, and the image may be encoded or decoded by determining a data unit optimized based on characteristics of an image.

Data units may be determined by recursively performing a flexible tree split. The flexible tree split may include a binary split, a ternary split, or a quadtree split. Also, by allowing square data units and non-square data units, data units optimized for coding may be determined according to characteristics of images. However, because various split shapes and various shapes of data units are used, coding complexity may increase. Accordingly, there is a need for image decoding/encoding methods and apparatuses for increasing coding efficiency and reducing complexity by using a flexible tree split.

DESCRIPTION OF EMBODIMENTS

Technical Problem

Provided are image decoding/encoding methods and apparatuses for increasing coding efficiency and reducing complexity by determining a splitting method of a block, in consideration of a size of a pipeline data unit for a hardware design.

Solution to Problem

To overcome the above-described technical problem, a video decoding method proposed in the disclosure includes: generating coding units by splitting at least one of a height and a width of a largest coding unit having a first size; based on whether a height or width of a non-square first coding unit including an outer boundary of an image, among the coding units, is greater than a maximum transform size, determining whether it is allowed to generate two second coding units by splitting at least one of the height and the width of the first coding unit; and decoding the second coding units generated from the first coding unit by inversely transforming the second coding units by using the maximum transform size.

The determining of whether it is allowed to generate two second coding units by splitting at least one of the height and the width of the first coding unit may include: when a length of the height of the first coding unit is greater than the maximum transform size and a length of the width of the first coding unit is equal to the maximum transform size, allowing that smaller coding units are to be generated by performing a horizontal binary split on the first coding unit; and disallowing that smaller coding units are to be generated by performing a vertical binary split on the first coding unit.

The determining of whether it is allowed to generate two second coding units by splitting at least one of the height and the width of the first coding unit may include: when a length of the height of the first coding unit is equal to the maximum transform size and a length of the width of the first coding unit is greater than the maximum transform size, allowing that smaller coding units are to be generated by performing a vertical binary split on the first coding unit; and disallowing that smaller coding units are to be generated by performing a horizontal binary split on the first coding unit.

The video decoding method may further include, when a length of a height of a coding unit including the outer boundary of the image is greater than the maximum transform size and a length of a width of the coding unit is greater than the maximum transform size, allowing that smaller coding units are to be generated by performing a quadtree split on the coding unit.

Lengths of heights and widths of the coding units may be greater than or equal to the maximum transform size.

The generating of the coding units by splitting at least one of the height and the width of the largest coding unit having the first size may include, based on information about a size of the largest coding unit obtained from a bitstream, determining the largest coding unit of the first size by splitting the image.

The generating of the coding units by splitting at least one of the height and the width of the largest coding unit having the first size may include: obtaining, from a bitstream, information about a minimum size of a luma coding unit, information about a difference between maximum and minimum sizes of a luma coding unit generated by performing a binary split on an intra slice, information about a difference between maximum and minimum sizes of a luma coding unit generated by performing a binary split on an inter slice, information about a difference between maximum and minimum sizes of a luma coding unit generated by performing a ternary split on an intra slice, and information about a difference between maximum and minimum sizes of a luma coding unit generated by performing a ternary split on an inter slice; by using the information about the minimum size of the luma coding unit and the information about the difference between the maximum and minimum sizes of the luma coding unit generated by performing the binary split on the intra slice, determining a maximum size of a luma coding unit generated by performing a binary split, which is determinable in the intra slice; by using the information about the minimum size of the luma coding unit and the information about the difference between the maximum and minimum sizes of the luma coding unit generated by performing the ternary split on the intra slice, determining a maximum size of the luma coding unit generated by performing the ternary split, which is determinable in the intra slice; by using the information about the minimum size of the luma coding unit and the information about the difference between the maximum and minimum sizes of the luma coding unit generated by performing the binary split on the inter slice, determining a maximum size of the luma coding unit generated by performing the binary split, which is determinable in the inter slice; and by using the information about the minimum size of the luma coding unit and the information about the difference between the maximum and minimum sizes of the luma coding unit generated by performing the ternary split on the inter slice, determining a maximum size of the luma coding unit generated by performing the ternary split, which is determinable in the inter slice.

The generating of the coding units by splitting at least one the height and the width of the largest coding unit having the first size may include: obtaining, from the bitstream, information indicating whether a luma coding unit and a chroma coding unit are separately determined; when the luma coding unit and the chroma coding unit are separately determined according to the obtained information, obtaining, from the bitstream, information about a difference between maximum and minimum sizes of a chroma coding unit generated by performing a binary split on an intra slice and information about a difference between maximum and minimum sizes of a chroma coding unit generated by performing a ternary split on an intra slice; by using information about a minimum size of the chroma coding unit and the information about the difference between the maximum and minimum sizes of the chroma coding unit generated by performing the binary split on the intra slice, determining a maximum size of the chroma coding unit generated by performing the binary split, which is determinable in the intra slice; and by using the information about the minimum size of the chroma coding unit and the information about the difference between the maximum and minimum sizes of the chroma coding unit generated by performing the ternary split on the intra slice, determining a maximum size of the chroma coding unit generated by performing the ternary split, which is determinable in the intra slice.

The video decoding method may further include: when the first coding unit among the coding units is not adjacent to the outer boundary of the image, obtaining split type information of the first coding unit; when the split type information of the first coding unit indicates a binary split, splitting in half the height or width of the first coding unit and determining two second coding units each having a depth increased by 1 from a depth of the first coding unit; and when the split type information of the first coding unit indicates a ternary split, splitting the height or width of the first coding unit at a ratio of 1:2:1 and determining a third coding unit and two fourth coding units, the third coding unit having a depth increased by 1 from the depth of the first coding unit, and the fourth coding units each having a depth increased by 2 from the depth of the first coding unit.

To overcome the above-described technical problem, a video decoding apparatus proposed in the disclosure includes: a processor configured to determine coding units by splitting at least one of a height and a width of a largest coding unit having a first size, based on whether a height or width of a non-square first coding unit including an outer boundary of an image, among the coding units, is greater than a maximum transform size, determine whether it is allowed to generate two second coding units by splitting at least one of the height and the width of the first coding unit, and decode the second coding units generated from the first coding unit by inversely transforming the second coding units by using the maximum transform size; and a memory storing data generated by the processor.

To overcome the above-described technical problem, a video encoding method proposed in the disclosure includes: determining coding units by splitting at least one of a height and a width of a largest coding unit having a first size; based on whether a height or width of a non-square first coding unit including an outer boundary of an image, among the coding units, is greater than a maximum transform size, determining whether it is allowed to generate two second coding units by splitting at least one of the height and the width of the first coding unit; and encoding the second coding units generated from the first coding unit by transforming the second coding units by using the maximum transform size.

The determining of whether it is allowed to generate two second coding units by splitting at least one of the height and the width of the first coding unit may include: when a length of the height of the first coding unit is greater than the maximum transform size and a length of the width of the first coding unit is equal to the maximum transform size, that smaller coding units are to be generated by performing a horizontal binary split on the first coding unit; and disallowing that smaller coding units are to be generated by performing a vertical binary split on the first coding unit.

The determining of whether it is allowed to generate two second coding units by splitting at least one of the height and the width of the first coding unit may include: when a length of the height of the first coding unit is equal to the maximum transform size and a length of the width of the first coding unit is greater than the maximum transform size, allowing that smaller coding units are to be generated by performing a vertical binary split on the first coding unit; and disallowing that smaller coding units are to be generated by performing a horizontal binary split on the first coding unit.

The video encoding method may further include, when a length of a height of a coding unit including the outer boundary of the image is greater than the maximum transform size and a length of a width of the coding unit is greater than the maximum transform size, allowing that smaller coding units are to be generated by performing a quadtree split on the coding unit.

The generating of the coding units by splitting at least one of the height and the width of the largest coding unit having the first size may include determining the largest coding unit having the first size by splitting the image, and encoding information about a size of the largest coding unit.

The video encoding method may further include: by using a minimum size of a luma coding unit and a maximum size of a luma coding unit generated by performing a binary split, which is determinable in an intra slice, determining information about a difference between maximum and minimum sizes of the luma coding unit generated by performing the binary split on the intra slice; by using the minimum size of the luma coding unit and a maximum size of a luma coding unit generated by performing a ternary split, which is determinable in an intra slice, determining information about a difference between maximum and minimum sizes of the luma coding unit generated by performing the ternary split on the intra slice; by using the minimum size of the luma coding unit and a maximum size of a luma coding unit generated by performing a binary split, which is determinable in an inter slice, determining information about a difference between maximum and minimum sizes of the luma coding unit generated by performing the binary split on the inter slice; and by using the minimum size of the luma coding unit and a maximum size of a luma coding unit generated by performing a ternary split, which is determinable in an inter slice, determining information about a difference between maximum and minimum sizes of the luma coding unit generated by performing the ternary split on the inter slice.

The video encoding method may further include: outputting, in a bitstream, the information about the minimum size of the luma coding unit, the information about the difference between the maximum and minimum sizes of the luma coding unit generated by performing the binary split on the intra slice, the information about the difference between the maximum and minimum sizes of the luma coding unit generated by performing the binary split on the inter slice, the information about the difference between the maximum and minimum sizes of the luma coding unit generated by performing the ternary split on the intra slice, and the information about the difference between the maximum and minimum sizes of the luma coding unit generated by performing the ternary split on the inter slice.

The video encoding method may further include: by using information about a minimum size of a chroma coding unit and a maximum size of a chroma coding unit generated by performing a binary split, which is determinable in an intra slice, determining information about a difference between maximum and minimum sizes of the chroma coding unit generated by performing the binary split on the intra slice; and by using the information about the minimum size of the chroma coding unit and a maximum size of a chroma coding unit generated by performing a ternary split, which is determinable in an intra slice, determining information about a difference between maximum and minimum sizes of the chroma coding unit generated by performing the ternary split on the intra slice.

The video encoding method may further include encoding information indicating whether the luma coding unit and the chroma coding unit are separately determined, and outputting the encoded information in the bitstream. The video encoding method may further include, when the luma coding unit and the chroma coding unit are separately determined, encoding the information about the difference between the maximum and minimum sizes of the chroma coding unit generated by performing the binary split on the intra slice and the information about the difference between the maximum and minimum sizes of the chroma coding unit generated by performing the ternary split on the intra slice, and outputting the encoded information in the bitstream.

The video encoding method may further include, when the first coding unit among the coding units is not adjacent to the outer boundary of the image, encoding split type information of the first coding unit, and outputting the encoded split type information in the bitstream. The video encoding method may further include: splitting in half the height or width of the first coding unit, determining two second coding units each having a depth increased by 1 from a depth of the first coding unit, and encoding split type information of the first coding unit indicating a binary split; and splitting the height or width of the first coding unit at a ratio of 1:2:1, determining a third coding unit and two fourth coding units, the third coding unit having a depth increased by 1 from the depth of the first coding unit, and the fourth coding units each having a depth increased by 2 from the depth of the first coding unit, and encoding split type information of the first coding unit indicating a ternary split.

To overcome the above-described technical problem, a video encoding apparatus proposed in the disclosure includes: a processor configured to determine coding units by splitting at least one of a height and a width of a largest coding unit having a first size, based on whether a height or width of a non-square first coding unit including an outer boundary of an image, among the coding units, is greater than a maximum transform size, determining whether it is allowed to generate two second coding units by splitting at least one of the height and the width of the first coding unit, and encoding the second coding units generated from the first coding unit by transforming the second coding units by using the maximum transform size; and a memory.

BRIEF DESCRIPTION OF DRAWINGS

FIG. 13 illustrates a process of determining a depth of a coding unit as a shape and size of the coding unit change, when the coding unit is recursively split such that a plurality of coding units are determined, according to an embodiment.

FIG. 29 illustrates a function for determining whether a coding unit is located at a boundary line of a pipeline data unit, according to an embodiment.

FIG. 30 illustrates a syntax signaled through a sequence parameter set (SPS), according to an embodiment.

MODE OF DISCLOSURE

Figure 1:
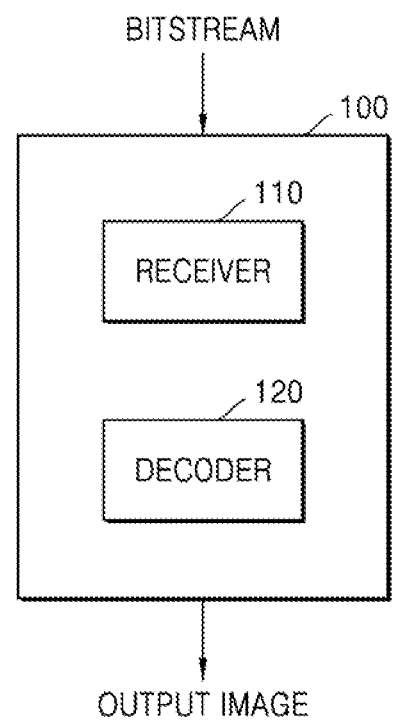
FIG. 1 illustrates a schematic block diagram of an image decoding apparatus according to an embodiment.

The advantages and features of the disclosure and methods of achieving the advantages and features will be described more fully with reference to the accompanying drawings, in which embodiments of the disclosure are shown. The disclosure may, however, be embodied in many different forms and should not be construed as being limited to the embodiments set forth herein; rather these embodiments are provided so that the disclosure will be thorough and complete, and will fully convey the concept of the disclosure to one of ordinary skill in the art.

The terms used herein will be briefly described, and disclosed embodiments will be described in detail.

The terms used in the embodiments are selected from among common terms that are currently widely used, in consideration of their function in the embodiments. However, the terms may become different according to an intention of one of ordinary skill in the art, a precedent, or the advent of new technology. Also, in particular cases, the terms are discretionally selected by the applicant of the disclosure, and the meaning of those terms will be described in detail in the corresponding part of the detailed description. Therefore, the terms used in the embodiments are not merely designations of the terms, but the terms are defined based on the meaning of the terms and content throughout the embodiments.

It will be understood that the singular forms "a," "an," and "the" include plural referents unless the context clearly dictates otherwise.

It will be understood that when a certain part "includes" a certain component, the part does not exclude another component but may further include another component, unless the context clearly dictates otherwise.

As used herein, the terms "portion", "module", or "unit" refers to a software or hardware component that performs predefined functions. However, the term "unit" is not limited to software or hardware. A "unit" may be configured to be in an addressable storage medium or configured to operate one or more processors. Thus, a "unit" may include, by way of example, components such as software components, object-oriented software components, class components, and task components, processes, functions, attributes, procedures, subroutines, segments of program code, drivers, firmware, microcode, circuitry, data, databases, data structures, tables, arrays, and variables. The functionality provided by the components and "units" may be combined into fewer components and "units" or further separated into additional components and "units".

According to an embodiment of the disclosure, the "unit" may include a processor and a memory. The term "processor" should be interpreted broadly to include a general purpose processor, a central processing unit (CPU), a microprocessor, a digital signal processor (DSP), a controller, a microcontroller, a state machine, etc. In some embodiments, the "processor" may indicate an application-specific integrated circuit (ASIC), a programmable logic device (PLD), a field programmable gate array (FPGA), etc. The term "processor" may refer to a combination of processing devices such as, for example, a combination of a DSP and a microprocessor, a combination of a plurality of microprocessors, a combination of one or more microprocessors in conjunction with a DSP core, or a combination of any other such configuration.

The term "memory" should be interpreted broadly to include any electronic component capable of storing electronic information. The term "memory" may refer to various types of processor-readable media, such as random access memory (RAM), read-only memory (ROM), non-volatile random access memory (NVRAM), programmable read-only memory (PROM), erase-programmable read-only memory (EPROM), electrically erasable PROM (EEPROM), flash memory, a magnetic or optical data storage device, registers, and the like. When the processor can read information from a memory and/or write information to the memory, the memory is stated to be in an electronic communication state with the processor. The memory integrated in the processor is in an electronic communication state with the processor.

Hereinbelow, an "image" may indicate a still image of a video or may indicate a dynamic image such as a moving image, that is, the video itself.

Hereinbelow, a "sample" denotes data assigned to a sampling location of an image, that is, data to be processed.

For example, pixel values in a spatial-domain image and transform coefficients on a transform region may be samples. A unit including at least one such sample may be defined as a block.

Also, in the specification, a "current block" may denote a block of a largest coding unit, a coding unit, a prediction unit, or a transform unit of a current image to be encoded or decoded.

Hereinbelow, embodiments of the disclosure will be described in detail with reference to the accompanying drawings so that the embodiments may be readily implemented by one of ordinary skill in the technical field to which the disclosure pertains. Also, portions irrelevant to the descriptions of the disclosure will be omitted in the drawings for clear descriptions of the disclosure.

Hereinbelow, according to an embodiment, an image encoding apparatus and an image decoding apparatus, and an image encoding method and an image decoding method will be described with reference to FIGS. 1 through 16. According to an embodiment, a method of determining a data unit of an image will be described with reference to FIGS. 3 through 16, according to an embodiment, a video encoding/decoding method considering a hardware design will be described below with reference to FIGS. 17 through 20, various combinations of pipeline data units will be described below with reference to FIGS. 21 through 28, a method of determining whether a coding unit is outside of a pipeline boundary line will be described below with reference to FIG. 29, and according to an embodiment, a method by which a video encoding apparatus 1700 and a video decoding apparatus 1900 signal information about a maximum size and a minimum size of a block allowed based on a split mode will be described below with reference to FIG. 30.

Hereinbelow, a method and apparatus for adaptively selecting a context model, based on various shapes of coding units, according to an embodiment of the disclosure, will be described with reference to FIGS. 1 and 2.

FIG. 1 illustrates a schematic block diagram of an image decoding apparatus according to an embodiment.

The image decoding apparatus 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information of an image encoded by an image encoding apparatus 2200 described below. Also, the bitstream may be transmitted from the image encoding apparatus 2200. The image encoding apparatus 2200 and the image decoding apparatus 100 may be connected via wires or wirelessly, and the receiver 110 may receive the bitstream via wires or wirelessly. The receiver 110 may receive the bitstream from a storage medium, such as an optical medium or a hard disk. The decoder 120 may reconstruct an image, based on information obtained from the received bitstream. The decoder 120 may obtain, from the bitstream, a syntax element for reconstructing the image. The decoder 120 may reconstruct the image, based on the syntax element.

Operations of the image decoding apparatus 100 will be described in detail with reference to FIG. 2.

Figure 2:
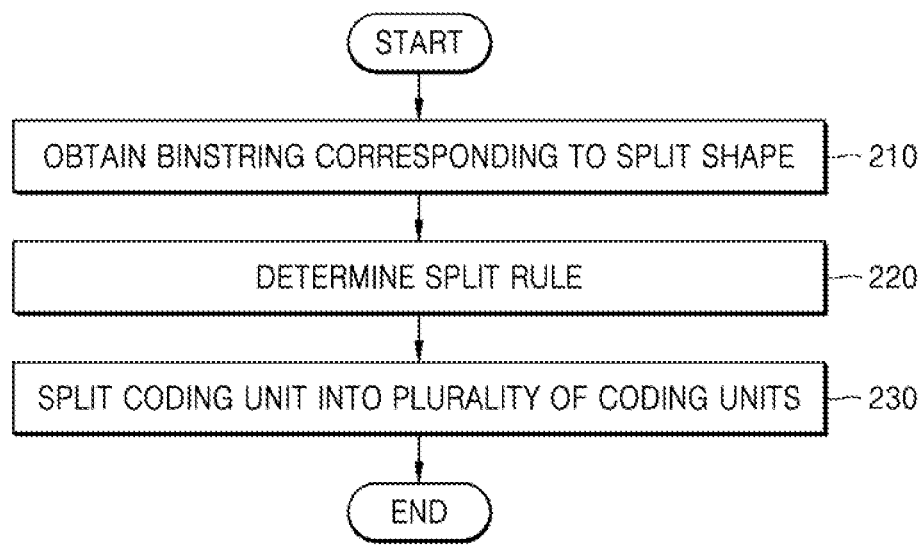
FIG. 2 illustrates a flowchart of an image decoding method according to an embodiment.

FIG. 2 illustrates a flowchart of an image decoding method according to an embodiment.

According to an embodiment of the disclosure, the receiver 110 receives a bitstream.

The image decoding apparatus 100 obtains, from a bitstream, a bin string corresponding to a split shape mode of a coding unit (operation 210). The image decoding apparatus 100 determines a split rule of coding units (operation 220). Also, the image decoding apparatus 100 splits the coding unit into a plurality of coding units, based on at least one of the bin string corresponding to the split shape mode and the split rule (operation 230). The image decoding apparatus 100 may determine an allowable first range of a size of the coding unit, according to a ratio of the width and the height of the coding unit, so as to determine the split rule. The image decoding apparatus 100 may determine an allowable second range of the size of the coding unit, according to the split shape mode of the coding unit, so as to determine the split rule.

Hereinbelow, splitting of a coding unit will be described in detail according to an embodiment of the disclosure.

First, one picture may be split into one or more slices or one or more tiles. One slice or one tile may be a sequence of one or more largest coding units (coding tree units (CTUs)). There is a largest coding block (coding tree block (CTB)) conceptually compared to a largest coding unit (CTU).

The largest coding block (CTB) denotes an N×N block including N×N samples (where N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a preset size including a preset number of samples, a largest coding block and a largest coding unit, or a coding block and a coding unit are mentioned in the following specification without being distinguished unless otherwise described.

An image may be split into largest coding units (CTUs). A size of a largest coding unit may be determined based on information obtained from a bitstream. The largest coding units may be in a shape of squares having the same size, although not limited thereto. However, the embodiment is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that is splittable into two may be obtained from a bitstream. The information about the luma block size difference may refer to a size difference between a luma largest coding unit and a largest luma coding block that is splittable into two. Accordingly, when the information about the maximum size of the luma coding block that is splittable into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from the bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units, based on split shape mode information obtained from the bitstream. At least one of information indicating whether a quad split is performed, information indicating whether a multi-split is performed, split direction information, and split type information may be obtained as the split shape mode information from the bitstream.

For example, the information indicating whether a quad split is performed may indicate whether a current coding unit is quad split (QUAD_SPLIT) or not.

When the current coding unit is not quad split, the information indicating whether a multi-split is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined as a binary horizontal split mode (SPLIT_BT_HOR), a split mode when the current coding unit is ternary split in the horizontal direction may be determined as a ternary horizontal split mode (SPLIT_TT_HOR), a split mode when the current coding unit is binary split in the vertical direction may be determined as a binary vertical split mode (SPLIT_BT_VER), and a split mode when the current coding unit is ternary split in the vertical direction may be determined as a ternary vertical split mode (SPLIT_TT_VER).

The image decoding apparatus 100 may obtain, from the bitstream, the split shape mode information from one bin string. A form of the bitstream received by the image decoding apparatus 100 may include fixed length binary code, unary code, truncated unary code, predetermined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad split a coding unit, whether not to split a coding unit, a split direction, and a split type, based on one bin string.

The coding unit may be smaller than or equal to a largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape mode information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 3 through 16.

Also, one or more prediction blocks for prediction may be determined from a coding unit. The prediction block may be the same as or smaller than the coding unit. Also, one or more transform blocks for transformation may be determined from a coding unit. The transform block may be the same as or smaller than the coding unit.

The shapes and sizes of the transform block and prediction block may not be related to each other.

In another embodiment, prediction may be performed by using a coding unit as a prediction block. Also, transformation may be performed by using a coding unit as a transform block.

The splitting of the coding unit will be described in detail with reference to FIGS. 3 through 16. A current block and an adjacent block of the disclosure may indicate one of the largest coding unit, the coding unit, the prediction block, and the transform block. Also, a current block or a current coding unit may be a block being currently decoded or encoded or a block being currently split. The neighboring block may be a block reconstructed earlier than a current block. The adjacent block may be adjacent to the current block spatially or temporally. The neighboring block may be located to any one of the left-lower side, left-upper side, upper side, right-upper side, right side, and right-lower side of the current block.

Figure 3:
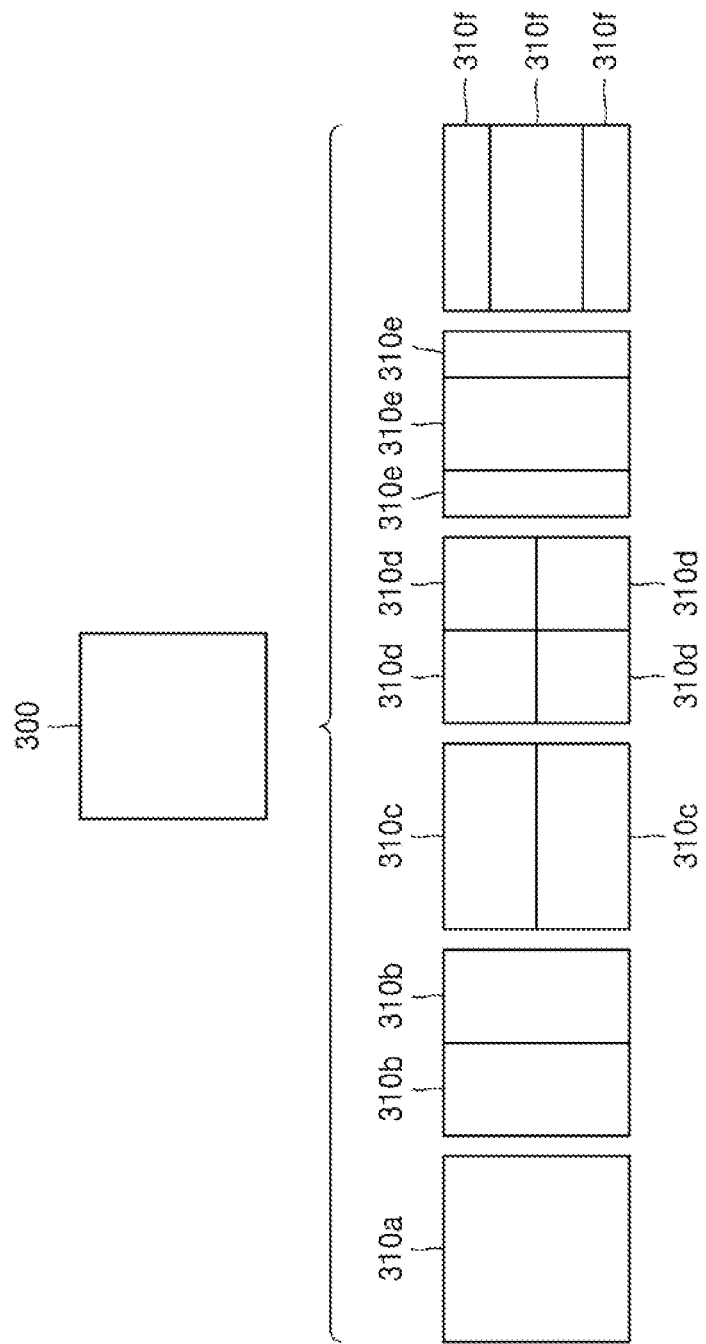
FIG. 3 illustrates a process, performed by an image decoding apparatus, of determining at least one coding unit by splitting a current coding unit, according to an embodiment.

FIG. 3 illustrates a process, performed by an image decoding apparatus, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, direction, a ratio of a width and height, or sizes of the coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the lengths of the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is a non-square, the image decoding apparatus 100 may determine the ratio of the width and height among the block shape information of the coding unit to be at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a split shape of the coding unit by using the split shape mode information. That is, a splitting method of the coding unit indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 2200 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In detail, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310a having the same size as the current coding unit 300 is not split, based on the split shape mode information indicating not to perform splitting, or may determine coding units 310b, 310c, 310d, 310e, or 310f split based on the split shape mode information indicating a preset splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform a ternary split in a vertical direction. The image decoding apparatus 100 may determine three coding units 310f obtained by splitting the current coding unit 300 in a horizontal direction, based on the split shape mode information indicating to perform a ternary split in a horizontal direction. However, split shapes into which the square coding unit is splittable are not limited to the above-described methods, and the split shape mode information may indicate various methods. Preset split shapes into which the square coding unit is to be split will be described in detail below in relation to various embodiments.

Figure 4:
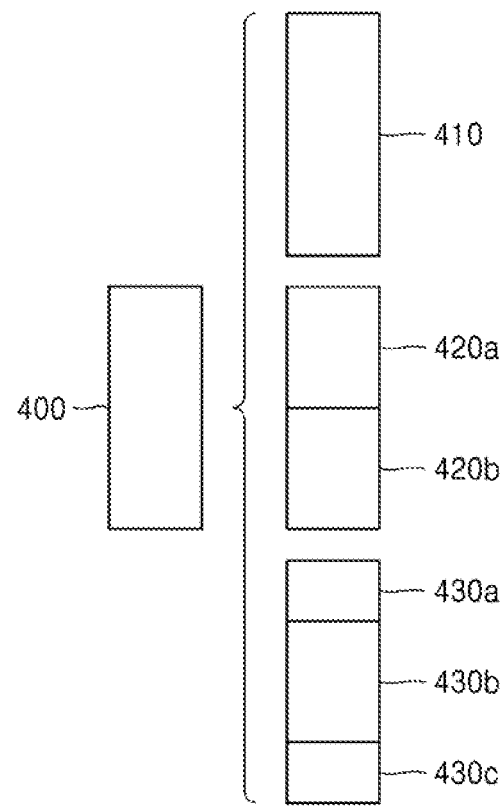
FIG. 4 illustrates a process, performed by an image decoding apparatus, of determining at least one coding unit by splitting a non-square coding unit, according to an embodiment.
Figure 4:
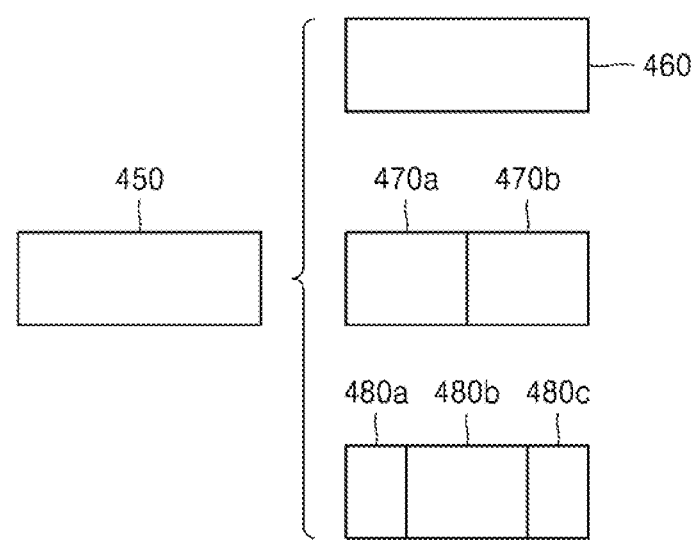

FIG. 4 illustrates a process, performed by an image decoding apparatus, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a preset splitting method, based on split shape mode information. Referring to FIG. 4, when the block shape information of a current coding unit 400 or 450 indicates a non-square shape, the image decoding apparatus 100 may determine that a coding unit 410 or 460 having the same size as the current coding unit 400 or 450 is not split, based on the split shape mode information indicating not to perform splitting, or determine coding units 420a and 420b, 430a to 430c, 470a and 470b, or 480a to 480c split based on the split shape mode information indicating a preset splitting method. Preset splitting methods of splitting a non-square coding unit will be described in detail below in relation to various embodiments.

According to an embodiment, the image decoding apparatus 100 may determine a split shape into which a coding unit is to be split by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may split a current coding unit in consideration of the location of a long side of the non-square current coding unit 400 or 450. For example, the image decoding apparatus 100 may determine a plurality of coding units by splitting the current coding unit 400 or 450 in a direction of splitting a long side of the current coding unit 400 or 450, in consideration of the shape of the current coding unit 400 or 450.

According to an embodiment, when the split shape mode information indicates to split (ternary split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of a width and height of the current coding unit 400 or 450 may be 4:1 or 1:4. When the ratio of the width and height is 4:1, the block shape information may indicate a horizontal direction because the length of the width is longer than the length of the height. When the ratio of the width and height is 1:4, the block shape information may indicate a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a to 430c by splitting the current coding unit 400 in the horizontal direction. Also, when the current coding unit 450 is in the horizontal direction, the image decoding apparatus 100 may determine the coding units 480a to 480c by splitting the current coding unit 450 in the vertical direction.

According to an embodiment, the image decoding apparatus 100 may determine the odd number of coding units included in the current coding unit 400 or 450, and not all the determined coding units may have the same size. For example, a preset coding unit 430b or 480b from among the determined odd number of coding units 430a, 430b, and 430c, or 480a, 480b, and 480c may have a size different from the size of the other coding units 430a and 430c, or 480a and 480c. That is, coding units which are determinable by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and moreover, may put a preset restriction on at least one coding unit from among the odd number of coding units generated by splitting the current coding unit 400 or 450. Referring to FIG. 4, the image decoding apparatus 100 may set a decoding process regarding the coding unit 430b or 480b located at the center among the three coding units 430a, 430b, and 430c, or 480a, 480b, and 480c generated as the current coding unit 400 or 450 is split to be different from that of the other coding units 430a and 430c, or 480a and 480c. For example, the image decoding apparatus 100 may restrict the coding unit 430b or 480b at the center location to be no longer split or to be split only a preset number of times, unlike the other coding units 430a and 430c, or 480a and 480c.

Figure 5:
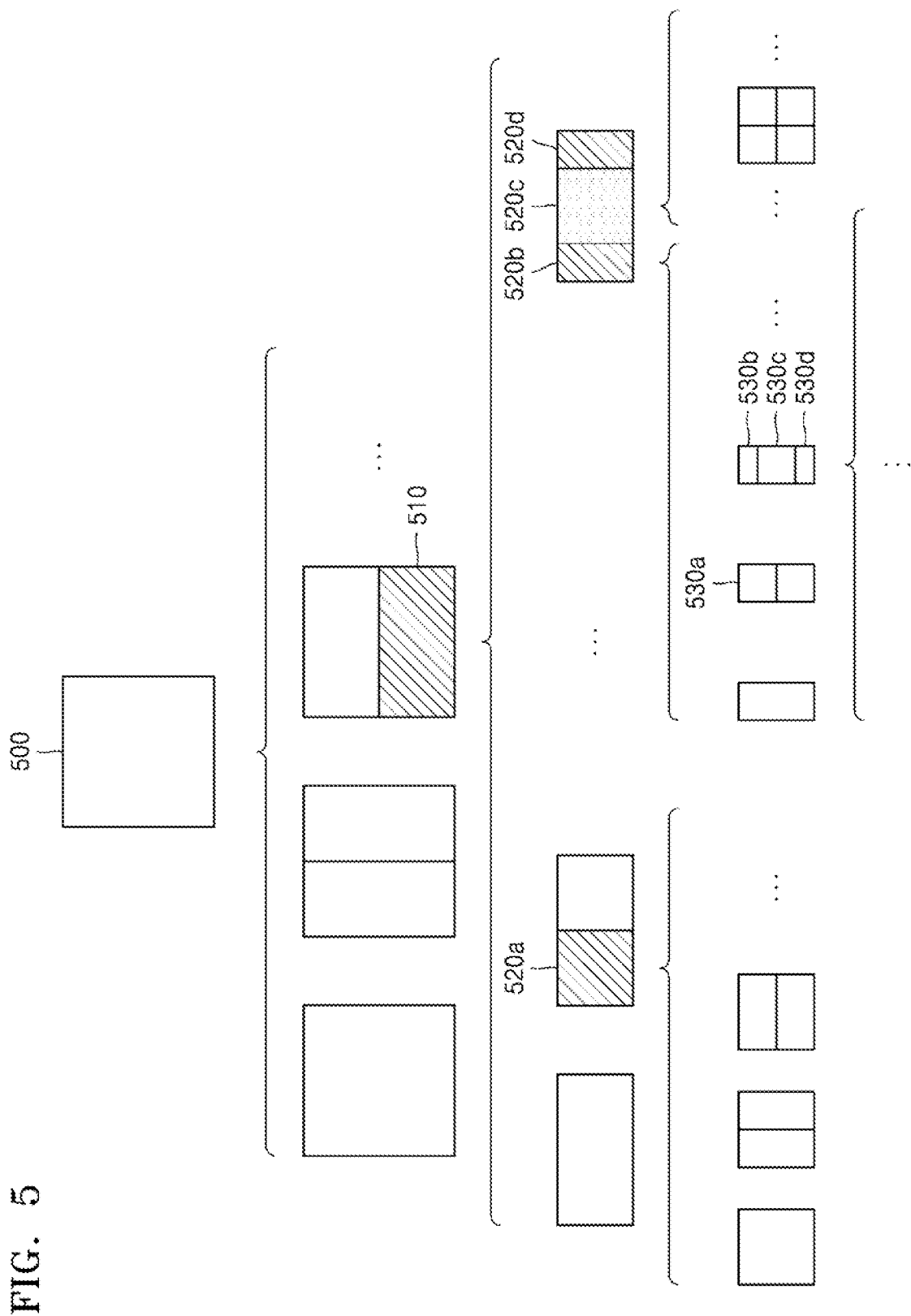
FIG. 5 illustrates a process, performed by an image decoding apparatus, of splitting a coding unit based on at least one of block shape information and split shape mode information, according to an embodiment.

FIG. 5 illustrates a process, performed by an image decoding apparatus, of splitting a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the relation of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may split the non-square second coding unit 510, which is determined by splitting the first coding unit 500, into one or more third coding units 520a, 520b, 520c, and 520d based on at least one of the split shape mode information and the split shape mode information, or may not split the non-square second coding unit 510. The image decoding apparatus 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units (e.g., 520a, or 520b, 520c, and 520d) based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a preset coding unit (e.g., a coding unit located at a center location, or a square coding unit) from among an odd number of third coding units 520b, 520c, and 520d determined by splitting the non-square second coding unit 510 may be recursively split. According to an embodiment, the square third coding unit 520c from among the odd number of third coding units 520b, 520c, and 520d may be split in a horizontal direction into a plurality of fourth coding units. A non-square fourth coding unit 530b or 530d from among the plurality of fourth coding units 530a, 530b, 530c, and 530d may be re-split into a plurality of coding units. For example, the non-square fourth coding unit 530b or 530d may be re-split into an odd number of coding units. A method that may be used to recursively split a coding unit will be described below in relation to various embodiments.

According to an embodiment, the image decoding apparatus 100 may split each of the third coding units 520a, or 520b, 520c, and 520d into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520b, 520c, and 520d. The image decoding apparatus 100 may put a preset restriction on a preset third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a preset splitting method (e.g., split into only four coding units or split by using a splitting method of the second coding unit 510), or to be split only a preset number of times (e.g., split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding apparatus 100 may obtain the split shape mode information, which is used to split a current coding unit, from a preset location in the current coding unit.

Figure 6:
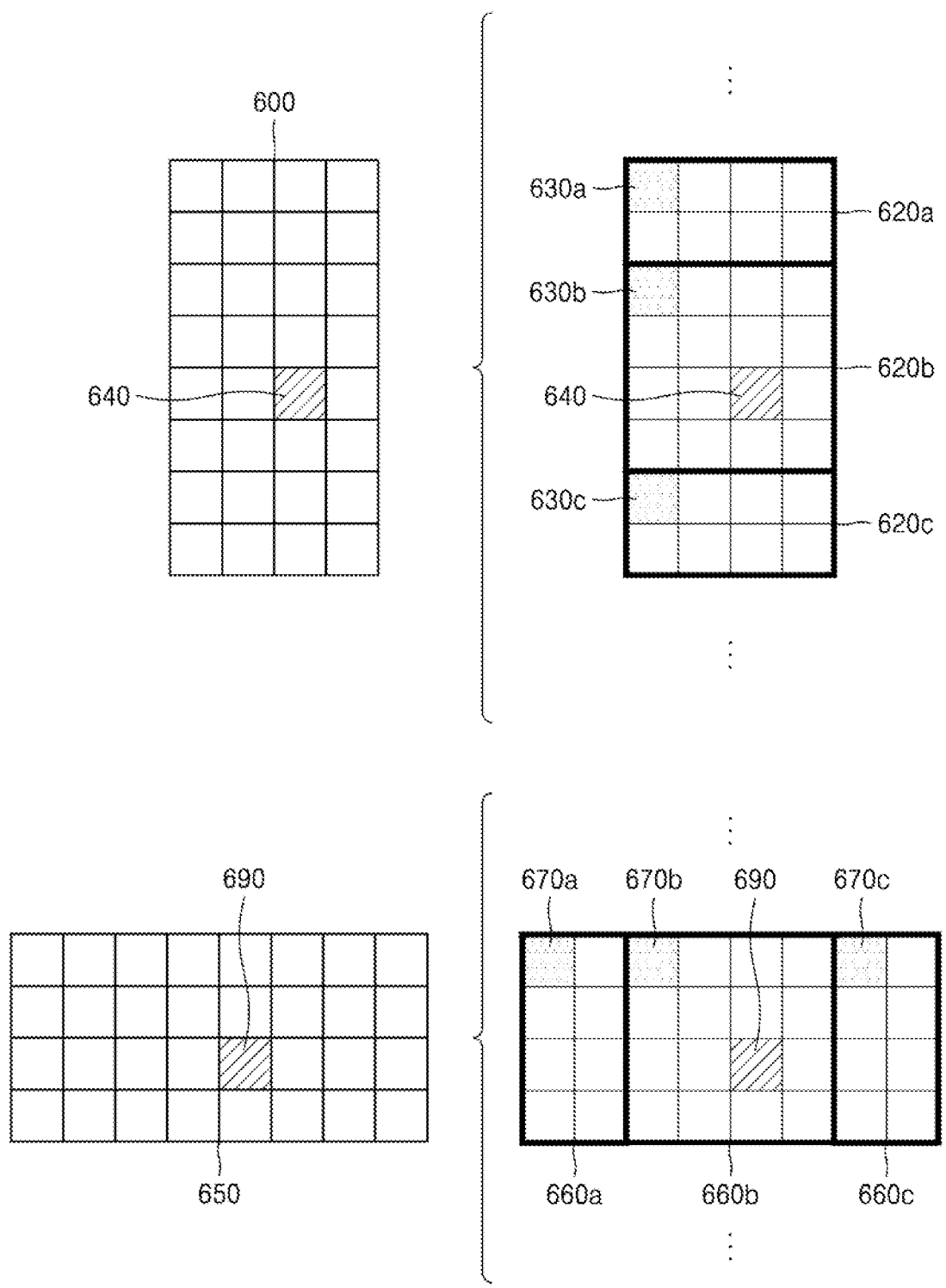
FIG. 6 illustrates a method, performed by an image decoding apparatus, of determining a preset coding unit from among an odd number of coding units, according to an embodiment.

FIG. 6 illustrates a method, performed by an image decoding apparatus, of determining a preset coding unit from among an odd number of coding units, according to an embodiment.

Referring to FIG. 6, split shape mode information of a current coding unit 600 or 650 may be obtained from a sample of a preset location (e.g., a sample 640 or 690 of a center location) from among a plurality of samples included in the current coding unit 600 or 650. However, the preset location in the current coding unit 600, from which at least one piece of the split shape mode information may be obtained, is not limited to the center location in FIG. 6, and may include various locations included in the current coding unit 600 (e.g., top, bottom, left, right, upper-left, lower-left, upper-right, lower-right locations, or the like). The image decoding apparatus 100 may obtain the split shape mode information from the preset location and may determine to split or not to split the current coding unit into various-shaped and various-sized coding units.

According to an embodiment, when the current coding unit is split into a preset number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a preset location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about the locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of preset samples included in the coding units 620a, 620b, and 620c. In detail, the image decoding apparatus 100 may determine the coding unit 620b at the center location by determining the locations of the coding units 620a, 620b, and 620c based on information indicating locations of upper-left samples 630a, 630b, and 630c of the coding units 620a, 620b, and 620c.

According to an embodiment, the information indicating the locations of the upper-left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the upper-left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the upper-left sample 630a of the upper coding unit 620a may include coordinates (xa, ya), information indicating the location of the upper-left sample 630b of the middle coding unit 620b may include coordinates (xb, yb), and information indicating the location of the upper-left sample 630c of the lower coding unit 620c may include coordinates (xc, yc). The image decoding apparatus 100 may determine the middle coding unit 620b by using the coordinates of the upper-left samples 630a, 630b, and 630c which are included in the coding units 620a, 620b, and 620c, respectively. For example, when the coordinates of the upper-left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the upper-left samples 630a, 630b, and 630c may include coordinates indicating absolute locations in the picture, or may use coordinates (dxb, dyb) indicating a relative location of the upper-left sample 630b of the middle coding unit 620b and coordinates (dxc, dyc) indicating a relative location of the upper-left sample 630c of the lower coding unit 620c with reference to the location of the upper-left sample 630a of the upper coding unit 620a. A method of determining a coding unit at a preset location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a preset criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information indicating the location of the upper-left sample 630a of the upper coding unit 620a, the coordinates (xb, yb) that is the information indicating the location of the upper-left sample 630b of the middle coding unit 620b, and the coordinates (xc, yc) that is the information indicating the location of the upper-left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a to 620c. Referring to FIG. 6, the image decoding apparatus 100 may determine the middle coding unit 620b, which has a size different from the size of the upper and lower coding units 620a and 620c, as the coding unit of the preset location. However, the above-described method, performed by the image decoding apparatus 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

The image decoding apparatus 100 may determine the width or height of each of the coding units 660a, 660b, and 660c by using the coordinates (xd, yd) that is information indicating the location of an upper-left sample 670a of the left coding unit 660a, the coordinates (xe, ye) that is information indicating the location of an upper-left sample 670b of the middle coding unit 660b, and the coordinates (xf, yf) that is information indicating a location of the upper-left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a to be the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 650. According to an embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a to 660c. Referring to FIG. 6, the image decoding apparatus 100 may determine the middle coding unit 660b, which has a size different from the sizes of the left and right coding units 660a and 660c, as the coding unit of the preset location. However, the above-described method, performed by the image decoding apparatus 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a preset location from among an odd number of coding units determined by splitting the current coding unit, in consideration of the shape of the current coding unit. For example, when the current coding unit has a non-square shape, a width of which is longer than a height, the image decoding apparatus 100 may determine the coding unit at the preset location in a horizontal direction. That is, the image decoding apparatus 100 may determine one of coding units at different locations in a horizontal direction and put a restriction on the coding unit. When the current coding unit has a non-square shape, a height of which is longer than a width, the image decoding apparatus 100 may determine the coding unit at the preset location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the preset location from among the even number of coding units. The image decoding apparatus 100 may determine an even number of coding units by splitting (binary splitting) on the current coding unit, and may determine the coding unit at the preset location by using the information about the locations of the even number of coding units. An operation related thereto may correspond to the operation of determining a coding unit at a preset location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, preset information about a coding unit at a preset location may be used in a splitting operation to determine the coding unit at the preset location from among the plurality of coding units. For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620*a*, 620*b*, and 620*c* based on the split shape mode information, and may determine the coding unit 620*b* at a center location from among the plurality of the coding units 620*a*, 620*b*, and 620*c*. Furthermore, the image decoding apparatus 100 may determine the coding unit 620*b* at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620*a*, 620*b*, and 620*c* based on the split shape mode information, the coding unit 620*b* including the sample 640 may be determined as the coding unit at the center location. However, information used to determine the coding unit at the center location is not limited to the split shape mode information, and various types of information may be used to determine the coding unit at the center location.

According to an embodiment, preset information for identifying the coding unit at the preset location may be obtained from a preset sample included in a coding unit to be determined. Referring to FIG. 6, the image decoding apparatus 100 may use the split shape mode information, which is obtained from a sample at a preset location in the current coding unit 600 (e.g., a sample at a center location of the current coding unit 600) to determine a coding unit at a preset location from among the plurality of the coding units 620*a*, 620*b*, and 620*c* determined by splitting the current coding unit 600 (e.g., a coding unit at a center location from among a plurality of split coding units). That is, the image decoding apparatus 100 may determine the sample at the preset location in consideration of a block shape of the current coding unit 600, determine the coding unit 620*b* including a sample, from which preset information (e.g., the split shape mode information) may be obtained, from among the plurality of coding units 620*a*, 620*b*, and 620*c* determined by splitting the current coding unit 600, and may put a preset restriction on the coding unit 620*b*. Referring to FIG. 6, according to an embodiment, the image decoding apparatus 100 may determine the sample 640 at the center location of the current coding unit 600 as the sample from which the preset information may be obtained, and may put a preset restriction on the coding unit 620*b* including the sample 640, in a decoding operation. However, the location of the sample from which the preset information may be obtained is not limited to the above-described location, and may include arbitrary locations of samples included in the coding unit 620*b* to be determined for a restriction.

According to an embodiment, the location of the sample from which the preset information may be obtained may be determined based on the shape of the current coding unit 600. According to an embodiment, the block shape information may indicate whether the current coding unit has a square or non-square shape, and the location of the sample from which the preset information may be obtained may be determined based on the shape. For example, the image decoding apparatus 100 may determine a sample located on a boundary for splitting in half at least one of a width and height of the current coding unit, as the sample from which the preset information may be obtained, by using at least one of information about the width of the current coding unit and information about the height of the current coding unit. As another example, when the block shape information of the current coding unit indicates a non-square shape, the image decoding apparatus 100 may determine one of samples including a boundary for splitting in half a long side of the current coding unit, as the sample from which the preset information may be obtained.

According to an embodiment, when the current coding unit is split into a plurality of coding units, the image decoding apparatus 100 may use the split shape mode information to determine a coding unit at a preset location from among the plurality of coding units. According to an embodiment, the image decoding apparatus 100 may obtain the split shape mode information from a sample at a preset location in a coding unit, and split the plurality of coding units, which are generated by splitting the current coding unit, by using the split shape mode information, which is obtained from the sample of the preset location in each of the plurality of coding units. That is, a coding unit may be recursively split based on the split shape mode information, which is obtained from the sample at the preset location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a preset block (e.g., the current coding unit).

Figure 7:
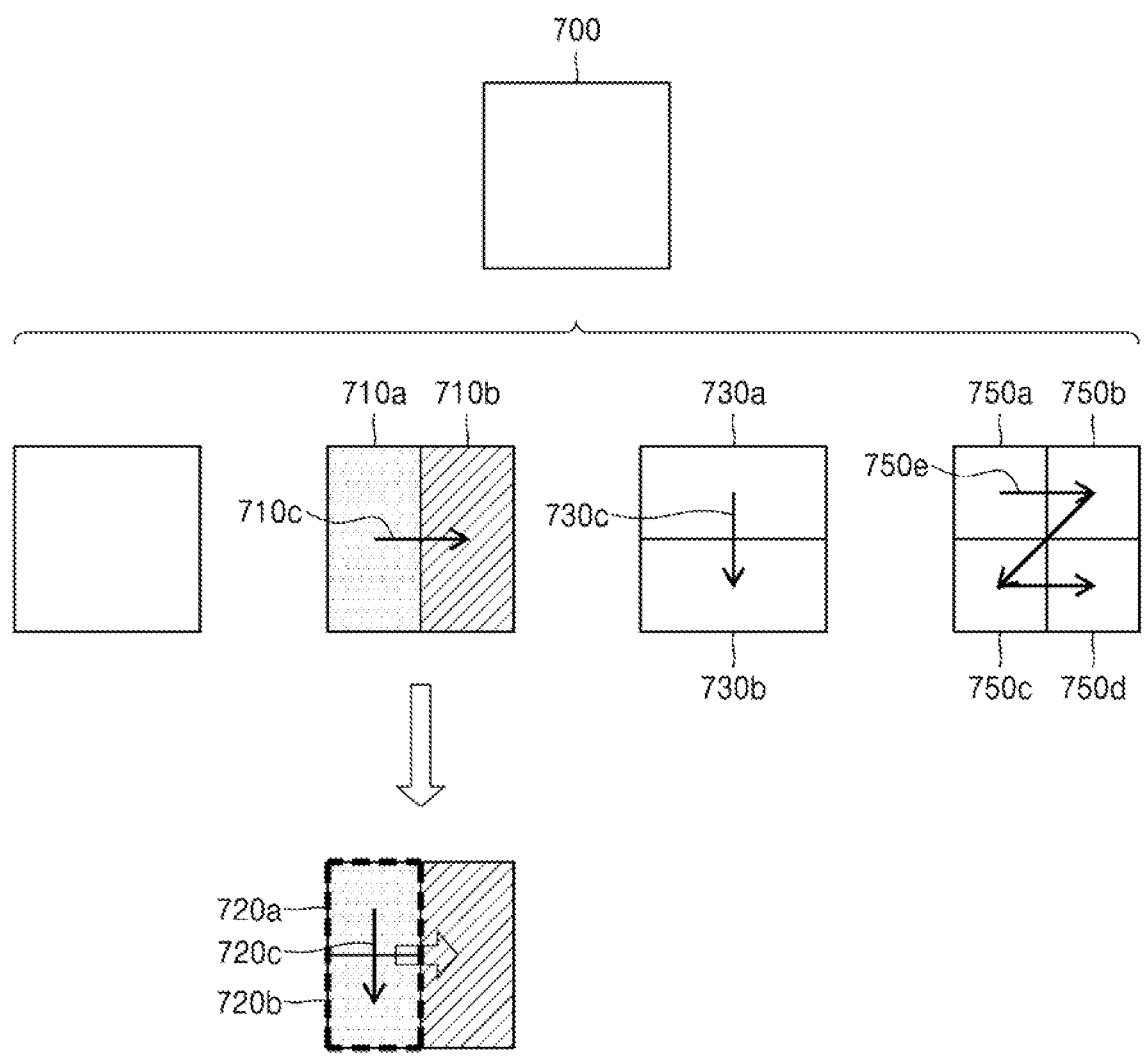
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when an image decoding apparatus determines the plurality of coding units by splitting a current coding unit, according to an embodiment.

According to an embodiment, the image decoding apparatus 100 may determine second coding units 710*a* and 710*b* by splitting a first coding unit 700 in a vertical direction, determine second coding units 730*a* and 730*b* by splitting the first coding unit 700 in a horizontal direction, or determine second coding units 750a, 750b, 750c, and 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine the second coding units 750a to 750d, which are determined by splitting the first coding unit 700 in vertical and horizontal directions, according to a preset order (e.g., a raster scan order or Z-scan order 750e) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710a and 710b, 730a and 730b, or 750a to 750d by splitting the first coding unit 700, and recursively split each of the determined plurality of coding units 710a, 710b, 730a, 730b, 750a, 750b, 750c, and 750d. A splitting method of the plurality of coding units 710a and 710b, 730a and 730b, or 750a to 750d may correspond to a splitting method of the first coding unit 700. As such, each of the plurality of coding units 710a and 710b, 730a and 730b, or 750a to 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a preset order.

Figure 8:
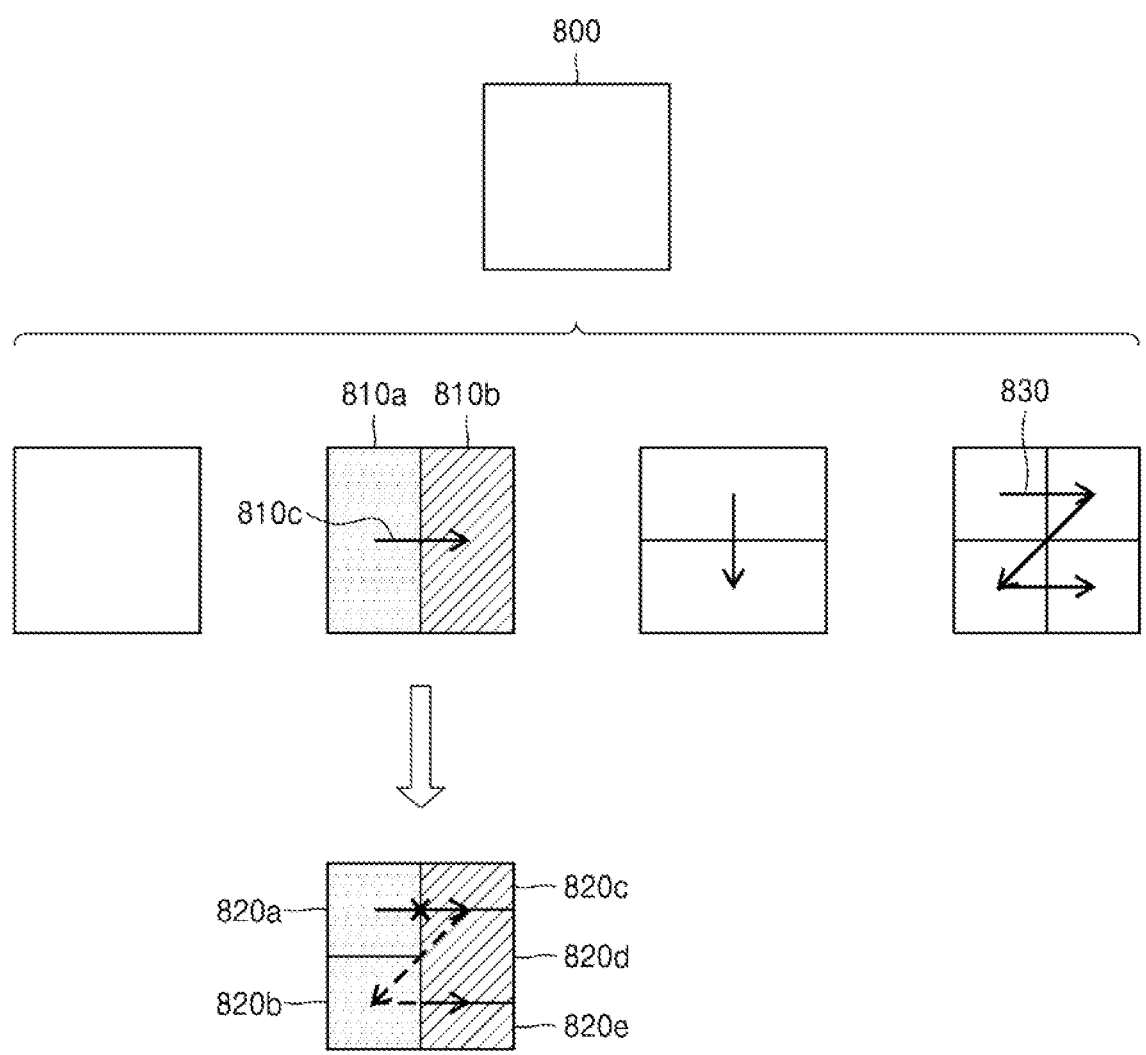
FIG. 8 illustrates a process, performed by an image decoding apparatus, of determining that a current coding unit is to be split into an odd number of coding units, when the coding units are not processable in a preset order, according to an embodiment.

FIG. 8 illustrates a process, performed by an image decoding apparatus, of determining that a current coding unit is to be split into an odd number of coding units, when the coding units are not processable in a preset order, according to an embodiment.

According to an embodiment, the image decoding apparatus 100 may determine that the current coding unit is split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c, 820d, and 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c to 820e.

According to an embodiment, the image decoding apparatus 100 may determine whether any coding unit is split into an odd number of coding units, by determining whether the third coding units 820a and 820b, and 820c to 820e are processable in a preset order. Referring to FIG. 8, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, or the third coding units 820a and 820b, and 820c to 820e are split into an odd number of coding units, based on at least one of the block shape information and the split shape mode information. For example, a coding unit located in the right from among the second coding units 810a and 810b may be split into an odd number of third coding units 820c, 820d, and 820e. A processing order of a plurality of coding units included in the first coding unit 800 may be a preset order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the preset order.

According to an embodiment, the image decoding apparatus 100 may determine whether the third coding units 820a and 820b, and 820c to 820e included in the first coding unit 800 satisfy the condition for processing in the preset order, and the condition relates to whether at least one of a width and height of the second coding units 810a and 810b is to be split in half along a boundary of the third coding units 820a and 820b, and 820c to 820e. For example, the third coding units 820a and 820b determined when the height of the left second coding unit 810a of the non-square shape is split in half may satisfy the condition. It may be determined that the third coding units 820c to 820e do not satisfy the condition because the boundaries of the third coding units 820c to 820e determined when the right second coding unit 810b is split into three coding units are unable to split in half the width or height of the right second coding unit 810b. When the condition is not satisfied as described above, the image decoding apparatus 100 may determine disconnection of a scan order, and may determine that the right second coding unit 810b is to be split into an odd number of coding units, based on a result of the determination. According to an embodiment, when a coding unit is split into an odd number of coding units, the image decoding apparatus 100 may put a preset restriction on a coding unit at a preset location from among the split coding units. The restriction or the preset location has been described above in relation to various embodiments, and thus detailed descriptions thereof will not be provided herein.

Figure 9:
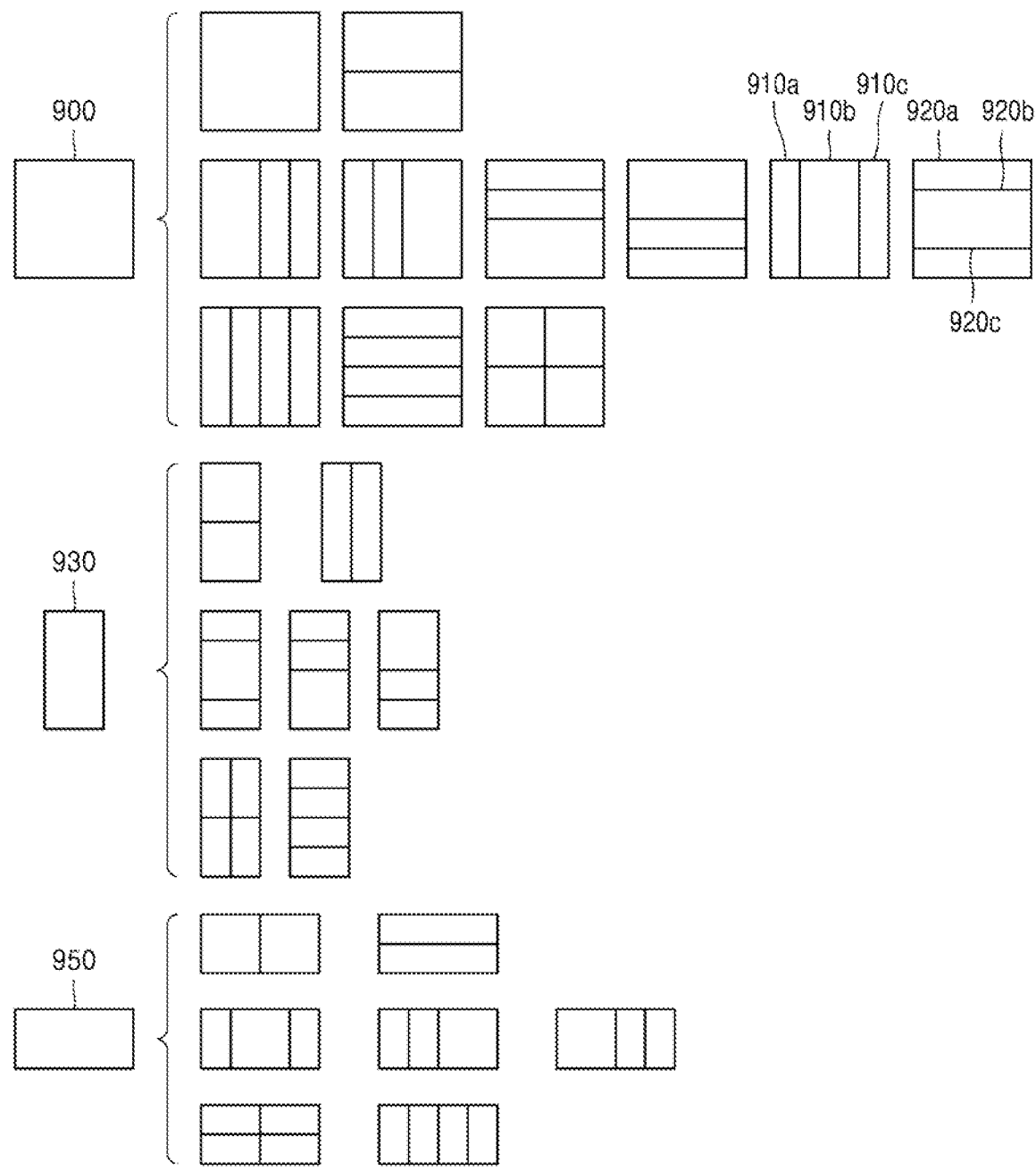
FIG. 9 illustrates a process, performed by an image decoding apparatus, of determining at least one coding unit by splitting a first coding unit, according to an embodiment.

FIG. 9 illustrates a process, performed by an image decoding apparatus, of determining at least one coding unit by splitting a first coding unit, according to an embodiment.

According to an embodiment, the image decoding apparatus 100 may split the first coding unit 900, based on split shape mode information, which is obtained through the receiver 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, and 910c, and 920a, 920b, and 920c included in the first coding unit 900 satisfy a condition for processing in a preset order, and the condition relates to whether at least one of a width and height of the first coding unit 900 is to be split in half along a boundary of the second coding units 910a, 910b, and 910c, and 920a, 920b, and 920c. Referring to FIG. 9, because boundaries of the second coding units 910a, 910b, and 910c determined by splitting the square first coding unit 900 in a vertical direction do not split in half the width of the first coding unit 900, it may be determined that the first coding unit 900 does not satisfy the condition for processing in the preset order. Also, because boundaries of the second coding units 920a, 920b, and 920c determined by splitting the square first coding unit 900 in a horizontal direction do not split in half the height of the first coding unit 900, it may be determined that the first coding unit 900 does not satisfy the condition for processing in the preset order. When the condition is not satisfied as described above, the image decoding apparatus 100 may decide disconnection of a scan order, and may determine that the first coding unit 900 is to be split into an odd number of coding units, based on a result of the decision. According to an embodiment, when a coding unit is split into an odd number of coding units, the image decoding apparatus 100 may put a preset restriction on a coding unit at a preset location from among the split coding units. The restriction or the preset location has been described above in relation to various embodiments, and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
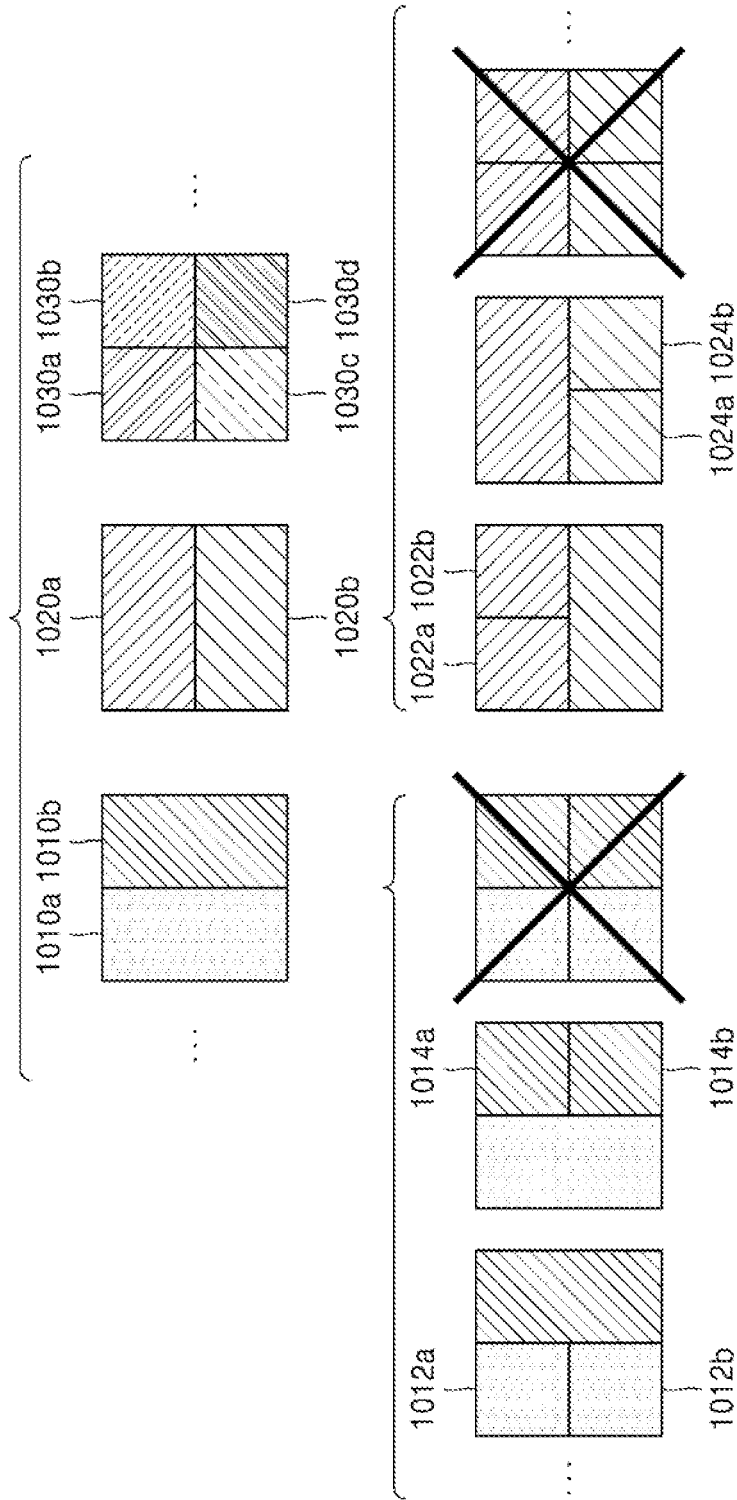
FIG. 10 illustrates that a shape into which a second coding unit is splittable is restricted when the second coding unit having a non-square shape, which is determined as the image decoding apparatus splits a first coding unit, satisfies a preset condition, according to an embodiment.

FIG. 10 illustrates that a shape into which a second coding unit is splittable is restricted when the second coding unit having a non-square shape, which is determined as the image decoding apparatus splits a first coding unit, satisfies a preset condition, according to an embodiment.

According to an embodiment, the image decoding apparatus 100 may determine to split the square first coding unit 1000 into non-square second coding units 1010a and 1010b, or 1020a and 1020b, based on split shape mode information, which is obtained by the receiver 110. The second coding units 1010a and 1010b, or 1020a and 1020b may be independently split. As such, the image decoding apparatus 100 may determine to split or not to split each of the second coding units 1010a and 1010b, or 1020a and 1020b into a plurality of coding units, based on the split shape mode information of each of the second coding units 1010a and 1010b, or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b, or 1014a and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b, or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) to not be split in a vertical direction in which the upper second coding unit 1020a is split.

Figure 11:
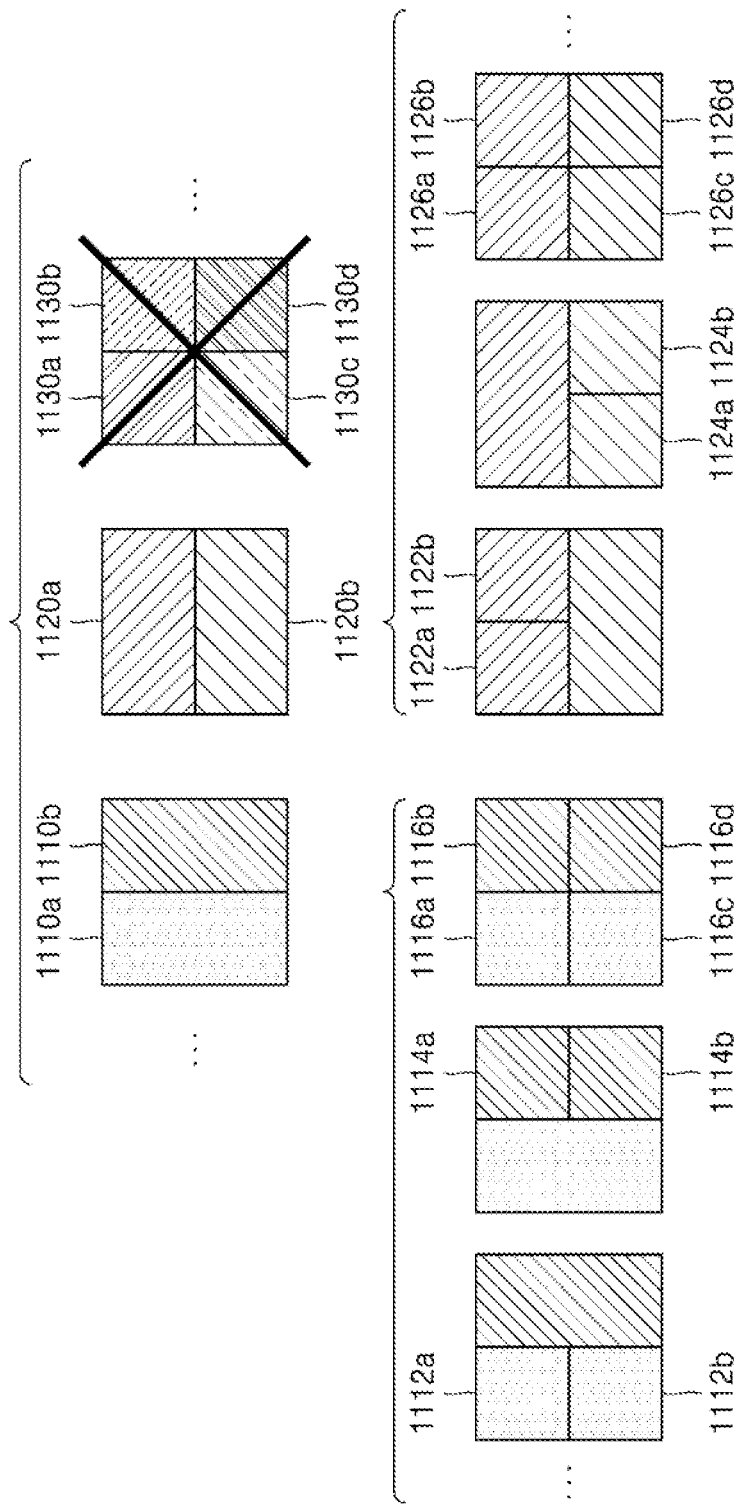
FIG. 11 illustrates a process, performed by an image decoding apparatus, of splitting a square coding unit when split shape mode information indicates that the square coding unit is not to be split into four square coding units, according to an embodiment.

FIG. 11 illustrates a process, performed by an image decoding apparatus, of splitting a square coding unit when split shape mode information indicates that the square coding unit is not to be split into four square coding units, according to an embodiment.

According to an embodiment, the image decoding apparatus 100 may determine second coding units 1110a and 1110b, or 1120a and 1120b, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1100 into four square second coding units 1130a, 1130b, 1130c, and 1130d. The image decoding apparatus 100 may determine the non-square second coding units 1110a and 1110b, or 1120a and 1120b, etc., based on the split shape mode information.

According to an embodiment, the image decoding apparatus 100 may independently split the non-square second coding units 1110a and 1110b, or 1120a and 1120b, etc. Each of the second coding units 1110a and 1110b, or 1120a and 1120b, etc. may be recursively split in a preset order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
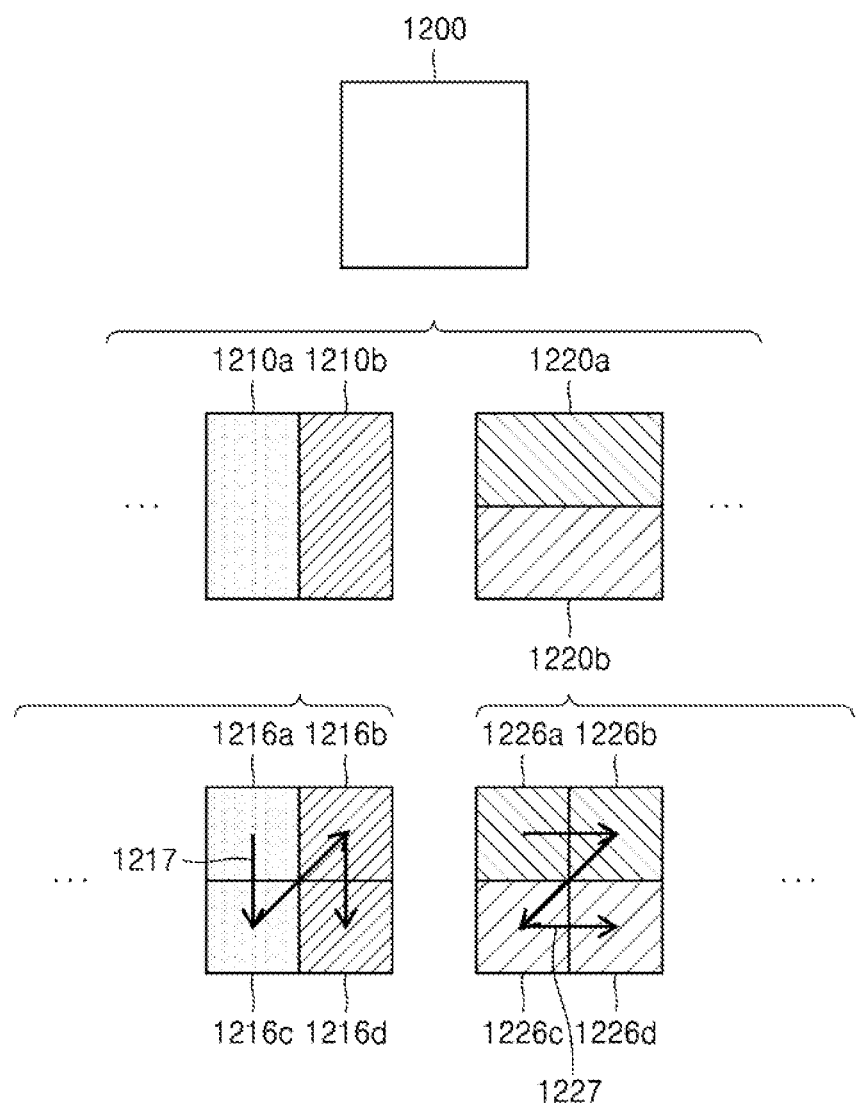
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal and vertical directions, the image decoding apparatus 100 may determine second coding units 1210a and 1210b, or 1220a and 1220b, etc. by splitting the first coding unit 1200. Referring to FIG. 12, the non-square second coding units 1210a and 1210b, or 1220a and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a vertical direction. An operation of splitting the second coding units 1210a and 1210b, or 1220a and 1220b has been described above in relation to FIG. 11, and thus detailed descriptions thereof will not be provided herein.

According to an embodiment, the image decoding apparatus 100 may process coding units in a preset order. An operation of processing coding units in a preset order has been described above in relation to FIG. 7, and thus detailed descriptions thereof will not be provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a split shape by which the first coding unit 1200 is split.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a preset criterion. For example, the preset criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a deeper depth.

Referring to FIG. 13, according to an embodiment, the image decoding apparatus 100 may determine a second coding unit 1302 and a third coding unit 1304 of deeper depths by splitting a square first coding unit 1300 based on block shape information indicating a square shape (e.g., the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (e.g., the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
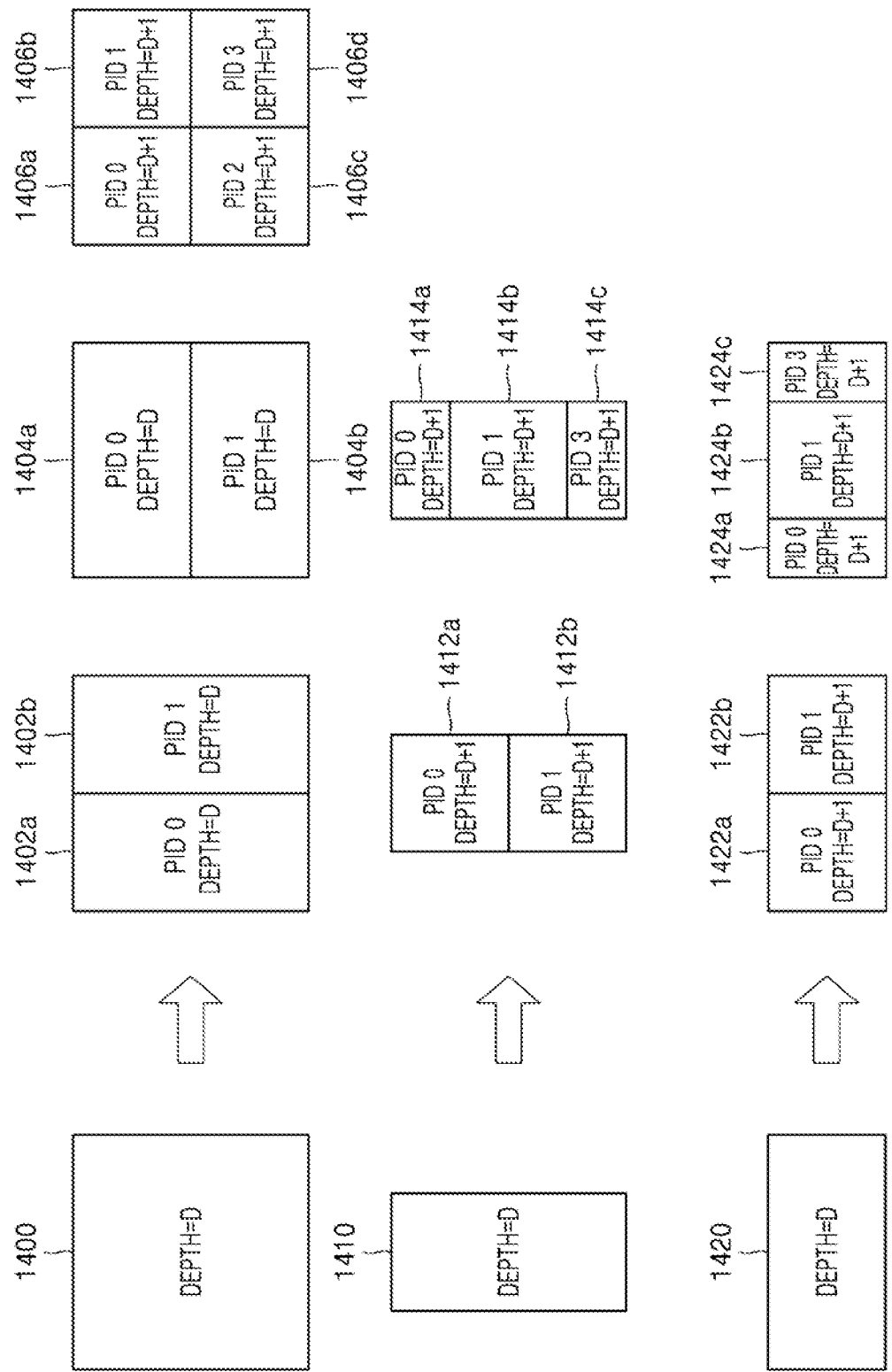
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, depths of the second coding units 1402a and 1402b, 1404a and 1404b, and 1406a, 1406b, 1406c, and 1406d that are determined based on the split shape mode information of the square first coding unit 1400 may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406*a*, 1406*b*, 1406*c*, and 1406*d* may be D+1 which is deeper than the depth D of the first coding unit 1400 by 1.

According to an embodiment, the image decoding apparatus 100 may determine a plurality of second coding units 1412*a* and 1412*b*, and 1414*a*, 1414*b*, and 1414*c* by splitting a first coding unit 1410, a height of which is longer than a width, in a horizontal direction based on the split shape mode information. According to an embodiment, the image decoding apparatus 100 may determine a plurality of second coding units 1422*a* and 1422*b*, and 1424*a*, 1424*b*, and 1424*c* by splitting a first coding unit 1420, a width of which is longer than a height, in a vertical direction based on the split shape mode information.

According to an embodiment, a depth of the second coding units 1412*a* and 1412*b*, and 1414*a*, 1414*b*, and 1414*c*, or 1422*a* and 1422*b*, and 1424*a*, 1424*b*, and 1424*c*, which are determined based on the split shape mode information of the non-square first coding unit 1410 or 1420, may be determined based on the length of a long side thereof. For example, because the length of a side of the square second coding units 1412*a* and 1412*b* is ½ times the length of a long side of the non-square first coding unit 1410, a height of which is longer than a width, a depth of the square second coding units 1412*a* and 1412*b* is D+1 which is deeper than the depth D of the non-square first coding unit 1410 by 1.

Furthermore, the image decoding apparatus 100 may split the non-square first coding unit 1410 into an odd number of second coding units 1414*a*, 1414*b*, and 1414*c*, based on the split shape mode information. The odd number of second coding units 1414*a*, 1414*b*, and 1414*c* may include the non-square second coding units 1414*a* and 1414*c* and the square second coding unit 1414*b*. In this case, because the length of a long side of the non-square second coding units 1414*a* and 1414*c* and the length of a side of the square second coding unit 1414*b* are ½ times the length of a long side of the non-square first coding unit 1410, a depth of the second coding units 1414*a*, 1414*b*, and 1414*c* may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414*b* of a center location among an odd number of split coding units 1414*a*, 1414*b*, and 1414*c* may have a width equal to that of the other coding units 1414*a* and 1414*c* and a height which is two times that of the other coding units 1414*a* and 1414*c*. That is, in this case, the coding unit 1414*b* at the center location may include two of the other coding unit 1414*a* or 1414*c*. Therefore, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412*a* and 1412*b* or an odd number of coding units 1414*a*, 1414*b*, and 1414*c* by splitting the first coding unit 1410 having a rectangular shape, a height of which is longer than a width. The image decoding apparatus 100 may use PIDs indicating respective coding units so as to identify the respective coding units. According to an embodiment, the PID may be obtained from a sample at a preset location of each coding unit (e.g., an upper-left sample).

According to an embodiment, the image decoding apparatus 100 may determine a coding unit at a preset location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PIDs of an odd number of split coding units to determine a coding unit at a center location from among the coding units. The image decoding apparatus 100 may determine the coding unit 1414*b* having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414*b* generated by splitting the first coding unit 1410 may have a width equal to that of the other coding units 1414*a* and 1414*c* and a height which is two times that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a preset location among an odd number of coding units (e.g., a coding unit of a centre location) has a size different from that of the other coding units. In this case, the image decoding apparatus 100 may determine the coding unit of the centre location, which has a different size, by using PIDs of the coding units. However, the PIDs and the size or location of the coding unit of the preset location are not limited to the above-described examples, and various PIDs and various locations and sizes of coding units may be used.

According to an embodiment, the image decoding apparatus 100 may use a preset data unit where a coding unit starts to be recursively split.

Figure 15:
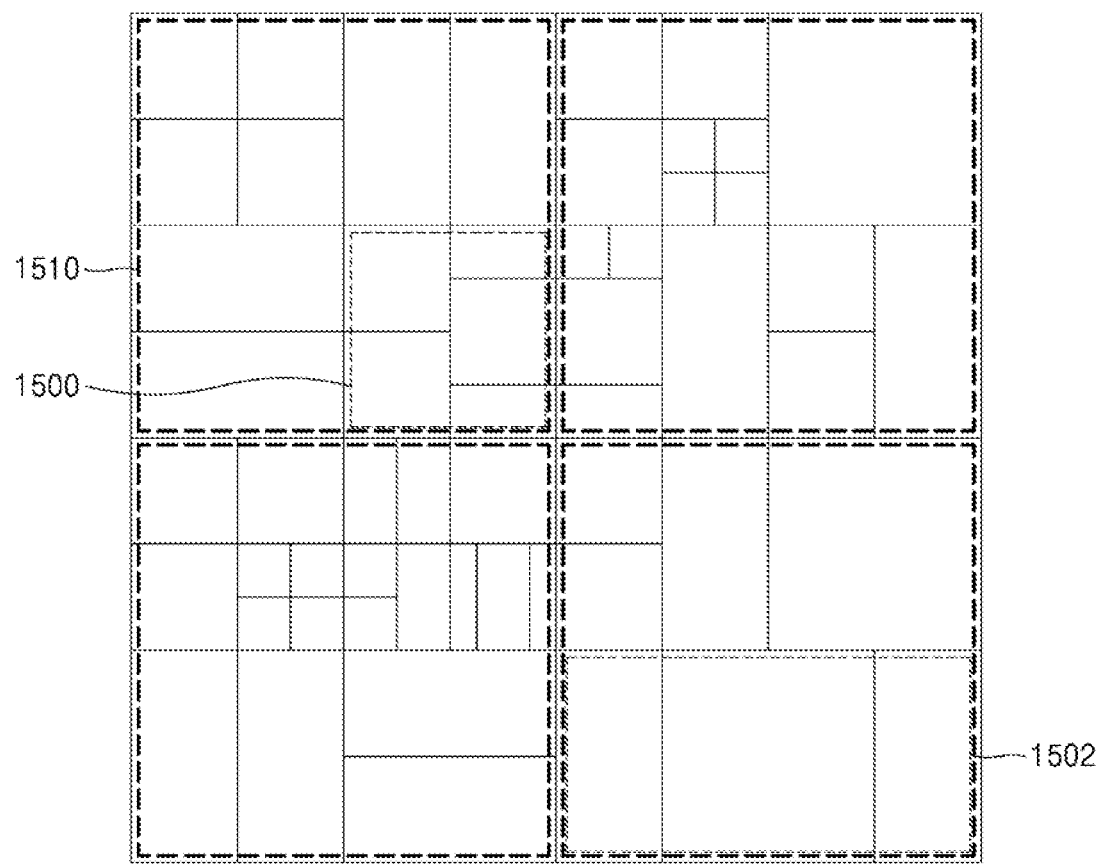
FIG. 15 illustrates that a plurality of coding units are determined based on a plurality of preset data units included in a picture, according to an embodiment.

FIG. 15 illustrates that a plurality of coding units are determined based on a plurality of preset data units included in a picture, according to an embodiment.

According to an embodiment, a preset data unit may be defined as a data unit where a coding unit starts to be recursively split by using split shape mode information. That is, the preset data unit may correspond to a coding unit of an uppermost depth, which is used to determine a plurality of coding units split from a current picture. In the following descriptions, for convenience of explanation, the preset data unit is referred to as a reference data unit.

According to an embodiment, the reference data unit may have a preset size and a preset shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the receiver 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a preset condition. That is, the receiver 110 may obtain, from the bitstream, only the PID for identifying the size and shape of reference coding units with respect to each slice, slice segment, tile, tile group, or largest coding unit which is a data unit satisfying a preset condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the preset condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 16:
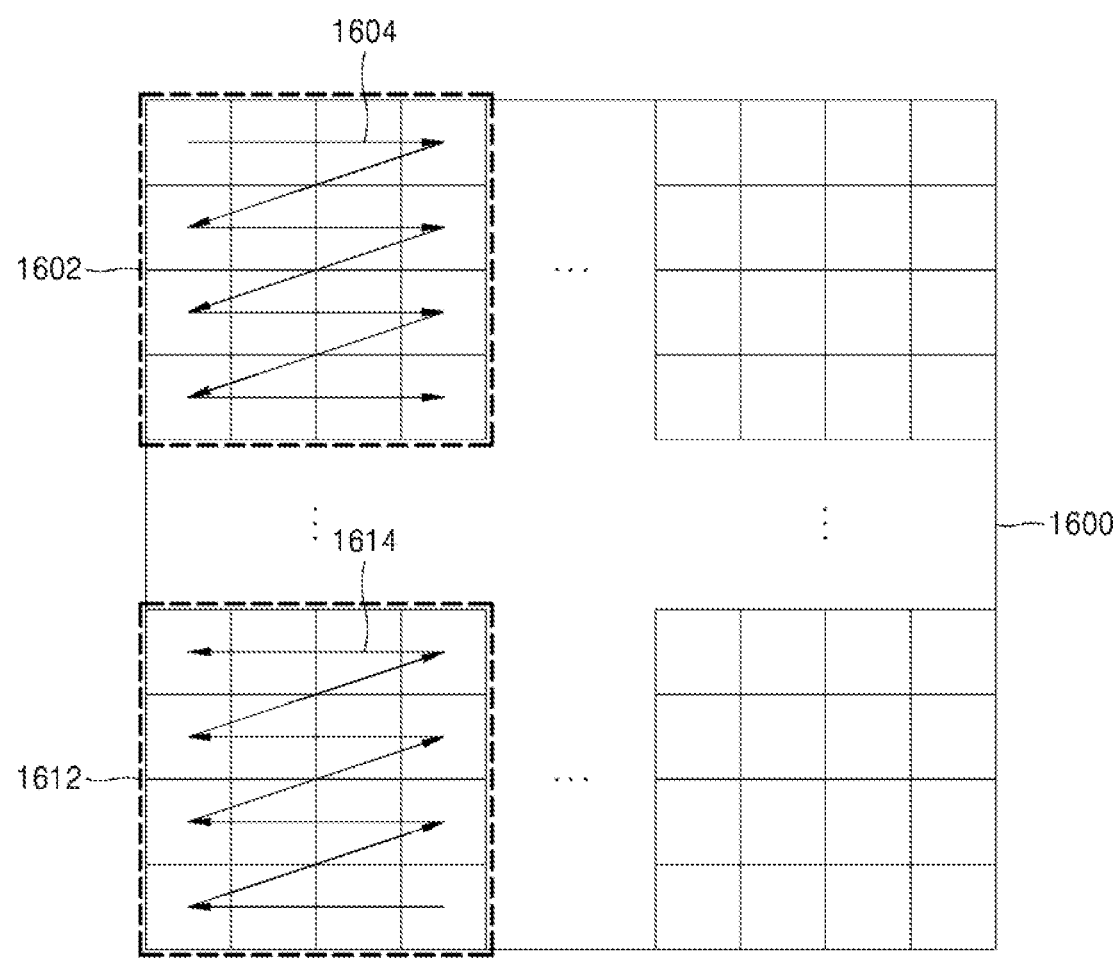
FIG. 16 illustrates a processing block serving as a criterion for determining a determination order of reference coding units included in a picture, according to an embodiment.

FIG. 16 illustrates a processing block serving as a criterion for determining a determination order of reference coding units included in a picture, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a preset size of data units, which is indicated by the processing block size information.

According to an embodiment, the receiver 110 of the image decoding apparatus 100 may obtain the processing block size information from the bitstream according to each specific data unit. For example, the processing block size information may be obtained from the bitstream in a data unit such as an image, sequence, picture, slice, slice segment, tile, or tile group. That is, the receiver 110 may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each specific data unit. For example, the receiver 110 may obtain the determination order information of reference coding units from the bitstream according to each data unit such as an image, sequence, picture, slice, slice segment, tile, tile group, or processing block. Because the determination order information of reference coding units indicates an order for determining reference coding units in a processing block, the determination order information may be obtained with respect to each specific data unit including an integer number of processing blocks.

According to an embodiment, the image decoding apparatus 100 may determine one or more reference coding units based on the determined determination order.

According to an embodiment, the receiver 110 may obtain the determination order information of reference coding units from the bitstream as information related to the processing blocks 1602 and 1612, and the image decoding apparatus 100 may determine a determination order of one or more reference coding units included in the processing blocks 1602 and 1612 and determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinbelow, a method of determining a split rule, according to an embodiment of the disclosure will be described in detail.

The image decoding apparatus 100 may determine a split rule of an image. The split rule may be predetermined between the image decoding apparatus 100 and the image encoding apparatus 2200. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, and a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, shape, a ratio of width and height, and a direction of the coding unit. The image encoding apparatus 2200 and the image decoding apparatus 100 may predetermine to determine the split rule based on the block shape of the coding unit. However, the embodiment is not limited thereto. The image decoding apparatus 100 may determine the split rule based on the information obtained from the bitstream received from the image encoding apparatus 2200.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, and to 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule predetermined between the image encoding apparatus 2200 and the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding processing orders. Because the decoding processing orders have been described above with reference to FIG. 12, details thereof are not provided again.

Hereinbelow, according to an embodiment of the present specification, a splitting method of a coding unit for efficient hardware implementation is provided, and a method and apparatus for encoding or decoding a video will be described in detail with reference to FIGS. 17 to 20.

Figure 17:
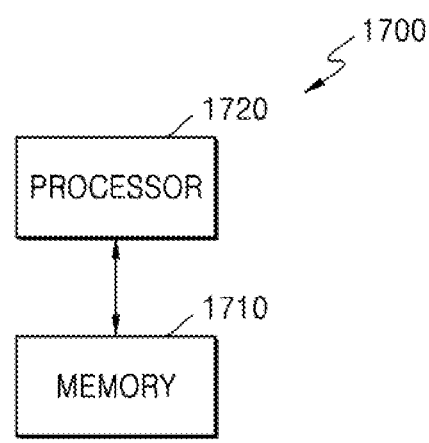
FIG. 17 illustrates a block diagram of a video encoding apparatus according to an embodiment.

FIG. 17 illustrates a block diagram of a video encoding apparatus according to an embodiment.

According to an embodiment, a video encoding apparatus 1700 may include a memory 1710 and at least one processor 1720 connected to the memory 1710. The operations of the video encoding apparatus 1700 according to the embodiment may be performed as individual processors or may be performed under the control of a central processor. Also, the memory 1710 of the video encoding apparatus 1700 may store data received from the outside and data generated by a processor, for example, split information related to a coding unit, prediction information related to the coding unit, and residual information related to the coding unit, information on whether a binary split of the coding unit is allowed, information on whether a ternary split of the coding unit is allowed, and the like.

In order to efficiently encode an image split into a plurality of blocks, the video encoding apparatus 1700 may perform encoding using a pipeline method that performs processes for a plurality of blocks in parallel. Hereinbelow, a block processed during one pipeline cycle to implement pipelined video encoding in hardware is referred to as a pipeline data unit. A size of a pipeline data unit may be predetermined.

Because the processor 1720 may access data for a current pipeline data unit during a current pipeline cycle, a block located in a pipeline may be encoded. However, because the processor 1720 may not be able to access data for a next pipeline data unit or a previous pipeline data unit during the current pipeline cycle, a block across the current pipeline data unit and the next pipeline data unit, or a block across the current pipeline data unit and the previous pipeline data unit may not be able to be encoded.

Also, in order to be able to perform encoding on a block in a pipeline data unit within a pipeline cycle, a size of a coding unit or a transform unit needs to be smaller than or equal to a size of the pipeline data unit.

Also, when an original point at an upper-left location of a coding unit includes an outline of an image, the coding unit may be outside of the image depending on a size of the coding unit, and thus the video encoding apparatus 1700 may determine to arbitrarily split the coding unit.

The processor 1720 of the video encoding apparatus 1700 may determine coding units by splitting at least one of a height and width of a largest coding unit having a first size, based on whether a height or width of a non-square first coding unit including an outer boundary of an image, among the coding units, is greater than a maximum transform size, determine whether it is allowed to generate two second coding units by splitting at least one of the height and width of the first coding unit, and perform encoding by transforming the second coding units generated from the first coding unit, by using the maximum transform size.

In this regard, the maximum transform size may be determined to be smaller than or equal to the size of the pipeline data unit, in consideration of the size of the pipeline data unit. Accordingly, encoding on the second coding units each having a size smaller than or equal to the maximum transform size may be processed during one pipeline cycle, and thus the video encoding apparatus 1700 may process the encoding using a pipeline method.

Hereinbelow, a detailed operation of a method by which the video encoding apparatus 1700 performs encoding using a coding unit determined from a largest coding unit will be described in detail with reference to FIG. 18.

Figure 18:
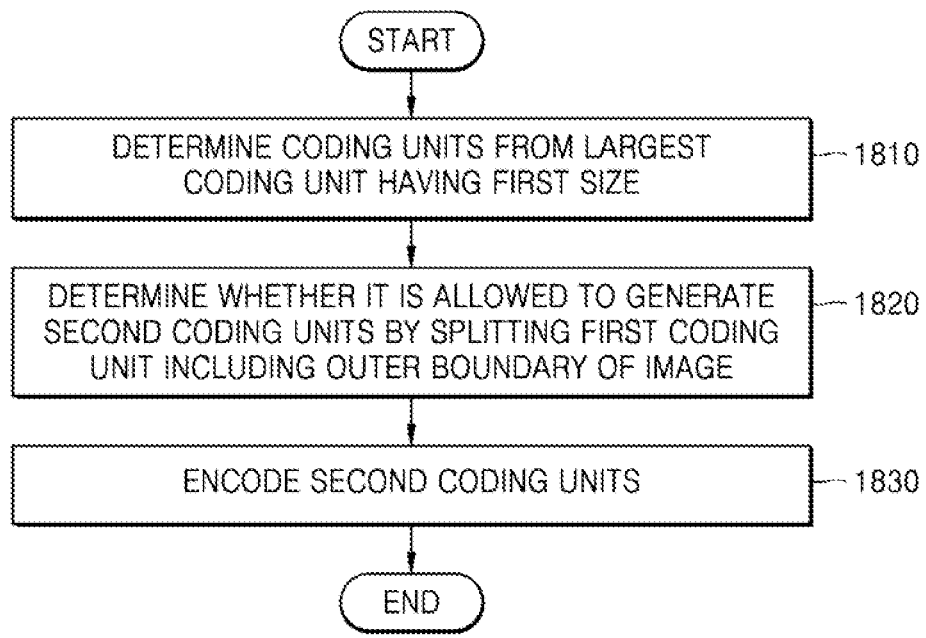
FIG. 18 illustrates a flowchart of a video encoding method according to an embodiment.

FIG. 18 illustrates a flowchart of a video encoding method according to an embodiment.

In operation 1810, the video encoding apparatus 1700 may generate coding units by splitting at least one of a height and width of a largest coding unit having a first size.

In operation 1820, based on whether a height or width of a non-square first coding unit including an outer boundary of an image, among the coding units, is greater than a maximum transform size, the video encoding apparatus 1700 may determine whether it is allowed to generate two second coding units by splitting at least one of the height and width of the first coding unit.

According to an embodiment, the video encoding apparatus 1700 may set a flag value indicating whether it is allowed to generate second coding units by splitting at least one of the height and width of the non-square first coding unit including the outer boundary of the image.

In operation 1820, according to an embodiment, when a length of the width of the non-square first coding unit including the outer boundary of the image is greater than the maximum transform size and a length of the height of the first coding unit is equal to the maximum transform size, the video encoding apparatus 1700 may allow that smaller coding units are to be generated by performing a vertical binary split on the first coding unit and disallow that smaller coding units are to be generated by performing a horizontal binary split on the first coding unit. In detail, the video encoding apparatus 1700 may set a vertical binary split flag value for allowing that smaller coding units are to be generated by performing a vertical binary split on the first coding unit and set a horizontal binary split flag value for disallowing that smaller coding units are to be generated by performing a horizontal binary split on the first coding unit.

According to an embodiment, when the length of the width of the non-square first coding unit including the outer boundary of the image is equal to the maximum transform size and the length of the height of the first coding unit is greater than the maximum transform size, the video encoding apparatus 1700 may allow that smaller coding units are to be generated by performing a horizontal binary split on the first coding unit and disallow that smaller coding units are to be generated by performing a vertical binary split on the first coding unit. In detail, the video encoding apparatus 1700 may set a horizontal binary split flag value for allowing that smaller coding units are to be generated by performing a horizontal binary split on the first coding unit and set a vertical binary split flag value for disallowing that smaller coding units are to be generated by performing a vertical binary split on the first coding unit.

According to an embodiment, when the length of the height of a coding unit including the outer boundary of the image is equal to the maximum transform size and the length of the width of the coding unit is greater than the maximum transform size, the video encoding apparatus 1700 may allow that smaller coding units are to be generated by performing a quadtree split on the coding unit.

According to an embodiment, the sizes of the height and width of coding units may be greater than or equal to the maximum transform size.

Also, in operation 1820, when the first coding unit is adjacent to the outline of the image so that the height or width of the first coding unit is outside of the outline of the image, the video encoding apparatus 1700 may disallow a binary split in a direction of splitting a height or width of the first coding unit, which may be outside of the outline of the image. As a specific example, when the height of the first coding unit is greater than the maximum transform size and the width of the first coding unit is outside of a right outline of the image, the video encoding apparatus 1700 may determine to disallow a vertical binary split for splitting the width of the first coding unit. Similarly, when the width of the first coding unit is greater than the maximum transform size and the height of the first coding unit is outside of a lower outline of the image, the video encoding apparatus 1700 may determine to disallow a horizontal binary split for splitting the height of the first coding unit.

However, when the height of the coding unit including the outer boundary of the image is outside of the lower outline of the image or the width of the coding unit is outside of the right outline of the image, the video encoding apparatus 1700 may allow a quadtree split of the coding unit.

In operation 1830, the video encoding apparatus 1700 may perform encoding by transforming a second coding unit generated from the first coding unit, using the maximum transform size. The video encoding apparatus 1700 may determine a prediction block by performing prediction on the second coding unit and determine a residual block consisting of difference values between sample values of an original block of the second coding unit and sample values of the prediction block. The video encoding apparatus 1700 may generate quantized transform coefficients by performing transformation and quantization on the residual block, and encode the second coding unit by performing entropy encoding on the quantized transform coefficients.

According to an embodiment, the video encoding apparatus 1700 may also determine whether to arbitrarily split a coding unit into coding units of a lower depth, in consideration of a size of a pipeline data unit. In order to complete transformation and quantization of residual data in the coding unit during one pipeline cycle, it is necessary to determine the size of the pipeline data unit equal to a size of a maximum transform unit. Also, when the pipeline data unit and the maximum transform unit have square shapes, heights and widths of the pipeline data unit and the maximum transform unit are equal to each other. Therefore, when a length of a height or width of the coding unit is greater than a length of the height or width of the maximum transform unit, by arbitrarily splitting the height or width of the coding unit to split the coding unit into coding units of a lower depth, an encoding process for the corresponding coding unit may be completed within one pipeline cycle.

Accordingly, embodiments will be described hereinbelow, in which, in order to complete transformation within a pipeline cycle, the video encoding apparatus 1700 compares a maximum transform size with at least one of a height and width of a coding unit and sets a vertical binary split flag value, a horizontal binary split flag value, and a quadtree split flag value respectively indicating whether a vertical binary split, a horizontal binary split, and a quadtree split of the coding unit are allowed.

In detail, in order to complete transformation within the pipeline cycle, when the length of the width of the coding unit is greater than the maximum transform size and the length of the height of the coding unit is equal to the maximum transform size, the video encoding apparatus 1700 may allow that smaller coding units are to be generated by performing a vertical binary split on the coding unit and disallow that smaller coding units are to be generated by performing a horizontal binary split on the coding unit.

In detail, in order to complete transformation within the pipeline cycle, when the length of the width of the coding unit is equal to the maximum transform size and the length of the height of the coding unit is greater than the maximum transform size, the video encoding apparatus 1700 may allow that smaller coding units are to be generated by performing a horizontal binary split on the coding unit and disallow that smaller coding units are to be generated by performing a vertical binary split on the coding unit.

In detail, in order to complete transformation within the pipeline cycle, when the length of the width of the coding unit is greater than the maximum transform size and the length of the height of the coding unit is equal to the maximum transform size, the video encoding apparatus 1700 may allow that smaller coding units are to be generated by performing a vertical binary split on the coding unit and disallow that smaller coding units are to be generated by performing a horizontal binary split on the coding unit.

In detail, in order to complete transformation within the pipeline cycle, when the length of the width of the coding unit is equal to the maximum transform size and the length of the height of the coding unit is greater than the maximum transform size, the video encoding apparatus 1700 may allow that smaller coding units are to be generated by performing a horizontal binary split on the coding unit and disallow that smaller coding units are to be generated by performing a vertical binary split on the coding unit.

In detail, in order to complete transformation within the pipeline cycle, when each of the sizes of the height and width of the coding unit is greater than the maximum transform size, the video encoding apparatus 1700 may allow that smaller coding units are to be generated by performing a quadtree split on the coding unit.

Also, according to an embodiment, the video encoding apparatus 1700 may pre-determine a maximum value and a minimum value to restrict a size of the largest coding unit or the coding unit, and encode information about the maximum and the minimum values.

In operation 1810, according to an embodiment, the video encoding apparatus 1700 may split the image into largest coding units having a constant size and encode the image. Each largest coding unit may be split into coding units having an optimal size from which the highest coding efficiency is obtainable. In this regard, the size of the largest coding unit may be predetermined, and the video encoding apparatus 1700 may encode information about the size of the largest coding unit and include the encoded information in a sequence parameter set (SPS). According to an embodiment, the size of the largest coding unit may be 128×128.

According to an embodiment, the video encoding apparatus 1700 may differently determine a maximum size and a minimum size of the coding unit based on a type of a slice.

In detail, the video encoding apparatus 1700 may set a minimum size of the luma coding unit and a maximum size of the luma coding unit generated by performing a binary split, in an intra slice. Also, by using the minimum size of the luma coding unit and the maximum size of the luma coding unit generated by performing the binary split on the intra slice, the video encoding apparatus 1700 may determine information about a difference between maximum and minimum sizes of the luma coding unit generated by performing the binary split on the intra slice. Also, the video encoding apparatus 1700 may encode the information about the difference between the maximum and minimum sizes of the luma coding unit generated by performing the binary split on the intra slice and include the encoded information in the SPS.

In detail, the video encoding apparatus 1700 may pre-set a maximum size of the luma coding unit generated by performing a ternary split on an intra slice. Also, by using the minimum size of the luma coding unit and the maximum size of the luma coding unit generated by performing the ternary split on the intra slice, the video encoding apparatus 1700 may determine information about a difference between maximum and minimum sizes of the luma coding unit generated by performing the ternary split on the intra slice. Moreover, the video encoding apparatus 1700 may encode the information about the maximum and minimum sizes of the luma coding unit generated by performing the ternary split on the intra slice and include the encoded information in the SPS.

In detail, the video encoding apparatus 1700 may pre-set a maximum size of the luma coding unit generated by performing a binary split on an inter slice. Also, by using the minimum size of the luma coding unit and the maximum size of the luma coding unit generated by performing the binary split on the inter slice, the video encoding apparatus 1700 may determine information about a difference between maximum and minimum sizes of the luma coding unit generated by performing the binary split on the inter slice. Also, the video encoding apparatus 1700 may encode the information about the difference between the maximum and minimum sizes of the luma coding unit generated by performing the binary split on the inter slice and include the encoded information in the SPS.

In detail, the video encoding apparatus 1700 may pre-set a maximum size of the luma coding unit generated by performing a ternary split on an inter slice. Also, by using the minimum size of the luma coding unit and the maximum size of the luma coding unit generated by performing the ternary split on the inter slice, the video encoding apparatus 1700 may determine information about a difference between maximum and minimum sizes of the luma coding unit generated by performing the ternary split on the inter slice. Also, the video encoding apparatus 1700 may encode the information about the difference between the maximum and minimum sizes of the luma coding unit generated by performing the ternary split on the inter slice and include the encoded information in the SPS.

According to an embodiment, the video encoding apparatus 1700 may determine whether a luma coding unit and a chroma coding unit are separately determined. The video encoding apparatus 1700 may encode information indicating whether the luma coding unit and the chroma coding unit are separately determined and include the encoded information in the SPS.

According to an embodiment, when the luma coding unit and the chroma coding unit are separately determined, the video encoding apparatus 1700 may pre-set a maximum size of the chroma coding unit generated by performing a binary split on an intra slice. Also, by using a minimum size of the chroma coding unit and the maximum size of the chroma coding unit generated by performing the binary split on the intra slice, the video encoding apparatus 1700 may determine information about a difference between maximum and minimum sizes of the chroma coding unit generated by performing the binary split on the intra slice. Also, the video encoding apparatus 1700 may encode the information about the difference between the maximum and minimum sizes of the chroma coding unit generated by performing the binary split on the intra slice and include the encoded information in the SPS.

According to an embodiment, when the luma coding unit and the chroma coding unit are separately determined, the video encoding apparatus 1700 may pre-set a maximum size of the chroma coding unit, generated by performing a ternary split, which is determinable in an intra slice. By using the minimum size of the chroma coding unit and the maximum size of the chroma coding unit generated by performing the ternary split on the intra slice, the video encoding apparatus 1700 may determine information about a difference between maximum and minimum sizes of the chroma coding unit generated by performing the ternary split on the intra slice. Also, the video encoding apparatus 1700 may encode the information about the difference between the maximum and minimum sizes of the chroma coding unit generated by performing the ternary split on the intra slice and include the encoded information in the SPS.

According to an embodiment, when a first coding unit among coding units is not adjacent to an outer boundary of an image, the video encoding apparatus 1700 may encode split type information of the first coding unit and output the encoded split type information in a bitstream.

In detail, when a binary split is performed on the first coding unit, the video encoding apparatus 1700 may determine two second coding units each having a depth that is increased by 1 from a depth of the first coding unit, and encode split type information of the first coding unit that indicates the binary split. For example, when the depth of the first coding unit is N, the depth of each of the two second coding units generated by performing the binary split on the first coding unit may be N+1. In this regard, an area of each of the second coding units may be ½ of an area of the first coding unit.

In detail, when a ternary split is performed on the first coding unit, the video encoding apparatus 1700 may determine a third coding unit having a depth that is increased by 1 from the depth of the first coding unit and two fourth coding units each having a depth that is increased by 2 from the depth of the first coding unit, and encode split type information of the first coding unit that indicates the ternary split. For example, when the depth of the first coding unit is N, the depth of the third coding unit may be N+1, and the depth of each of the two fourth coding units may be N+2, the third coding unit and the fourth coding units being generated by performing the ternary split on the first coding unit. In this regard, an area of the third coding unit may be ½ of the area of the first coding unit, and an area of each of the fourth coding units may be ¼ of the area of the first coding unit.

Hereinbelow, a video decoding process will be described in detail with reference to FIGS. 19 and 20.

Figure 19:
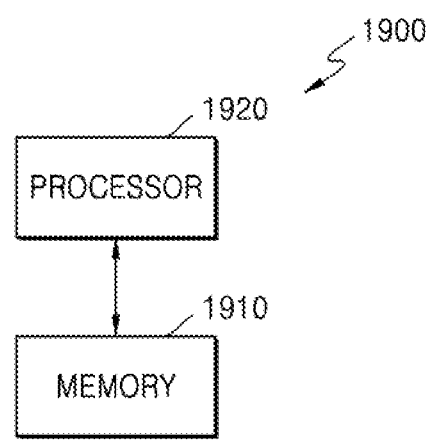
FIG. 19 illustrates a block diagram of a video decoding apparatus according to an embodiment.

FIG. 19 illustrates a block diagram of a video decoding apparatus according to an embodiment.

According to an embodiment, a video decoding apparatus 1900 may include a memory 1910 and at least one processor 1920 connected to the memory 1910. The operations of the video decoding apparatus 1900 according to the embodiment may be performed as individual processors or may be performed under the control of a central processor. Also, the memory 1910 of the video decoding apparatus 1900 may store data received from the outside and data generated by a processor, for example, split information, prediction information, and residual information related to a coding unit, information on whether a binary split of the coding unit is allowed, information on whether a ternary split of the coding unit is allowed, and the like.

In order to efficiently perform video decoding, similar to the video encoding apparatus 1700, the video decoding apparatus 1900 may perform decoding in a pipeline method that performs processes for a plurality of blocks in parallel. To this end, a pipeline data unit having the same size as determined by the video encoding apparatus 1700 may be used.

The processor 1920 may access data for a current pipeline data unit during a current pipeline cycle, and thus be able to decode a block located in a pipeline. However, the processor 1920 may not be able to decode a block across the current pipeline data unit and a next pipeline data unit, or a block across the current pipeline data unit and a previous pipeline data unit.

Also, as in the video encoding apparatus 1700, a size of a coding unit or a transform unit needs to be smaller than or equal to a size of the pipeline data unit.

Moreover, the video decoding apparatus 1900 may determine a splitting method of a coding unit into coding units of a lower depth according to split type information obtained from a bitstream.

However, when an original point at an upper-left location of the coding unit includes an outline of an image, the coding unit may be outside of the image depending on the size of the coding unit, and thus the video decoding apparatus 1900 may determine to arbitrarily split the coding unit into a shape in which the coding unit is not across the outline of the image, even without the split type information. Even though the split type information of the coding unit exists, the video decoding apparatus 1900 may ignore a value of the split type information and split the coding unit into a split shape in which the coding unit is not across the outline of the image. When the video decoding apparatus 1900 determines to arbitrarily split the coding unit, the value of the split type information may be changed and set to a split shape arbitrarily determined.

The processor 1920 of the video decoding apparatus 1900 may determine coding units by splitting at least one of a height and width of a largest coding unit having a first size, based on whether a height or width of a non-square first coding unit including an outer boundary of an image, among the coding units, is greater than a maximum transform size, determine whether it is allowed to generate two second coding units by splitting at least one of the height and width of the first coding unit, and perform decoding by inversely transforming the second coding units generated from the first coding unit, by using the maximum transform size.

In this regard, the maximum transform size may be determined to be smaller than or equal to the size of the pipeline data unit, in consideration of the size of the pipeline data unit. Accordingly, decoding on the second coding units each having a size smaller than or equal to the maximum transform size may be processed during one pipeline cycle, and thus the video decoding apparatus 1900 may process the decoding using a pipeline method.

Hereinbelow, a detailed operation of a method by which the video decoding apparatus 1900 performs decoding using a coding unit determined from a largest coding unit will be described in detail with reference to FIG. 20.

Figure 20:
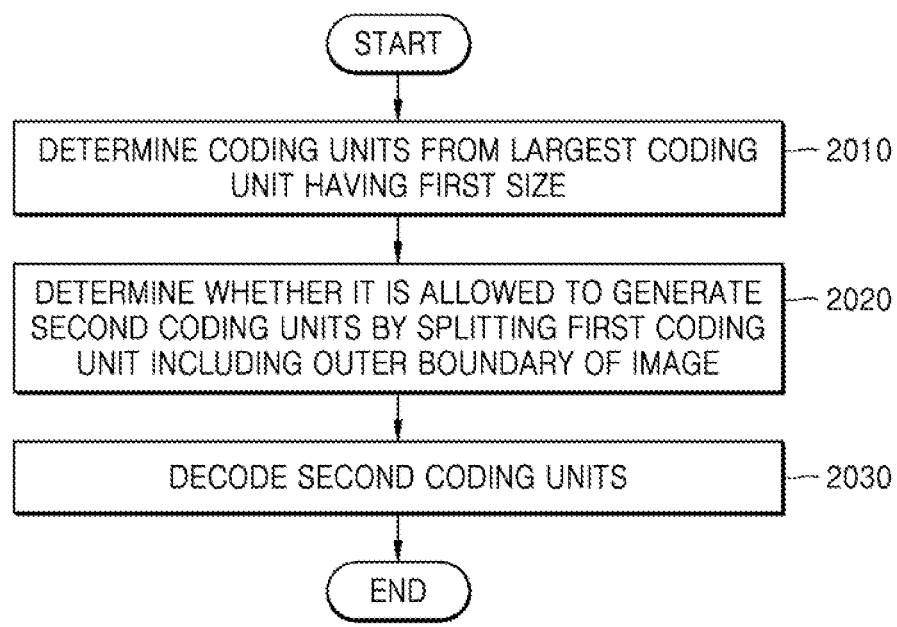
FIG. 20 illustrates a flowchart of a video decoding method according to an embodiment.

FIG. 20 illustrates a flowchart of a video decoding method according to an embodiment.

In operation 2010, the video decoding apparatus 1900 according to an embodiment may generate coding units by splitting at least one of a height and width of a largest coding unit having a first size.

In operation 2020, based on whether a height or width of a non-square first coding unit including an outer boundary of an image, among the coding units, is greater than a maximum transform size, the video decoding apparatus 1900 may determine whether it is allowed to generate two second coding units by splitting at least one of the height and width of the first coding unit.

According to an embodiment, the video decoding apparatus 1900 may set a flag value indicating whether it is allowed to generate second coding units by splitting at least one of the height and width of the first coding unit. In particular, when the first coding unit includes the outer boundary of the image, the first coding unit may be outside of the outer boundary of the image depending on the size of the first coding unit, and thus the video decoding apparatus 1900 may determine whether to allow that second coding units are to be generated by arbitrarily splitting at least one of the height and width of the first coding unit.

According to an embodiment, when the length of the width of the non-square first coding unit including the outer boundary of the image is greater than the maximum transform size and the length of the height of the first coding unit is equal to the maximum transform size, the video decoding apparatus 1900 may allow that smaller coding units are to be generated by performing a vertical binary split on the first coding unit and disallow that smaller coding units are to be generated by performing a horizontal binary split on the first coding unit. In detail, the video decoding apparatus 1900 may set a vertical binary split flag value for allowing that smaller coding units are to be generated by performing a vertical binary split on the first coding unit and set a horizontal binary split flag value for disallowing that smaller coding units are to be generated by performing a horizontal binary split on the first coding unit.

According to an embodiment, when the length of the width of the non-square first coding unit including the outline of the image is equal to the maximum transform size and the length of the height of the first coding unit is greater than the maximum transform size, the video decoding apparatus 1900 may allow that smaller coding units are to be generated by performing a horizontal binary split on the first coding unit and disallow that smaller coding units are to be generated by performing a vertical binary split on the first coding unit. In detail, the video decoding apparatus 1900 may set a horizontal binary split flag value for allowing that smaller coding units are to be generated by performing a horizontal binary split on the first coding unit and set a vertical binary split flag value for disallowing that smaller coding units are to be generated by performing a vertical binary split on the first coding unit.

According to an embodiment, when the length of each of the height and width of the coding unit including the outline of the image is greater than the maximum transform size, the video decoding apparatus 1900 may allow that smaller coding units are to be generated by performing a quadtree split on the coding unit. In detail, a quadtree split flag value for allowing that smaller coding units are to be generated by performing a quadtree split on the coding unit may be set.

According to an embodiment, the lengths of the height and width of the coding unit may be greater than or equal to the maximum transform size.

Also, in operation 2020, when the first coding unit is adjacent to the outline of the image so that the height or width of the first coding unit is outside of the outline of the image, the video decoding apparatus 1900 may disallow a binary split in a direction of splitting a height or width of the first coding unit, which may be outside of the outline of the image. As a specific example, when the height of the first coding unit is greater than the maximum transform size and the width of the first coding unit is outside of a right outline of the image, the video decoding apparatus 1900 may determine to disallow a vertical binary split for splitting the width of the first coding unit. Similarly, when the width of the first coding unit is greater than the maximum transform size and the height of the first coding unit is outside of a lower outline of the image, the video decoding apparatus 1900 may determine to disallow a horizontal binary split for splitting the height of the first coding unit.

However, when the height of the coding unit including the outer boundary of the image is outside of the lower outline of the image or the width of the coding unit is outside of the right outline of the image, the video decoding apparatus 1900 may allow a quadtree split of the coding unit.

In operation 2030, the video decoding apparatus 1900 may perform decoding by inversely transforming a second coding unit generated from the first coding unit, using the maximum transform size. The video decoding apparatus 1900 may determine a prediction block by performing prediction on the second coding unit, reconstructing a residual block by performing inversely quantizing and inversely transforming the second coding unit using a transform block, and determine a reconstruction block by synthesizing the prediction block and the residual block.

According to an embodiment, in response to the video encoding apparatus 1700 in which the size of the pipeline data unit is set equal to the maximum transform size to complete encoding within the pipeline cycle, in order for the video decoding apparatus 1900 to complete decoding within one pipeline cycle by performing inverse transformation and generating a reconstruction block, it is also necessary to set a size of a pipeline data unit used by the video decoding apparatus 1900 equal to the maximum transform size and arbitrarily split a coding unit based on the maximum transform size.

Accordingly, embodiments will be described hereinbelow, in which, in consideration of a pipeline cycle, the video decoding apparatus 1900 compares a maximum transform size with at least one of a height and width of a coding unit and sets a vertical binary split flag value, a horizontal binary split flag value, and a quadtree split flag value respectively indicating whether a vertical binary split, a horizontal binary split, and a quadtree split of the coding unit are allowed.

In detail, in order to complete decoding of the coding unit within the pipeline cycle, when the length of the width of the coding unit is greater than the maximum transform size and the length of the height of the coding unit is equal to the maximum transform size, the video decoding apparatus 1900 may allow that smaller coding units are to be generated by performing a vertical binary split on the coding unit and disallow that smaller coding units are to be generated by performing a horizontal binary split on the coding unit.

In detail, in order to complete decoding of the coding unit within the pipeline cycle, when the length of the width of the coding unit is equal to the maximum transform size and the length of the height of the coding unit is greater than the maximum transform size, the video decoding apparatus 1900 may allow that smaller coding units are to be generated by performing a horizontal binary split on the coding unit and disallow that smaller coding units are to be generated by performing a vertical binary split on the coding unit.

In detail, in order to complete decoding of the coding unit within the pipeline cycle, when the length of the width of the coding unit is greater than the maximum transform size and the length of the height of the coding unit is equal to the maximum transform size, the video decoding apparatus 1900 may allow that smaller coding units are to be generated by performing a vertical binary split on the coding unit and disallow that smaller coding units are to be generated by performing a horizontal binary split on the coding unit.

In detail, in order to complete decoding of the coding unit within the pipeline cycle, when the length of the width of the coding unit is equal to the maximum transform size and the length of the height of the coding unit is greater than the maximum transform size, the video decoding apparatus 1900 may allow that smaller coding units are to be generated by performing a horizontal binary split on the coding unit and disallow that smaller coding units are to be generated by performing a vertical binary split on the coding unit.

In detail, in order to complete decoding of the coding unit within the pipeline cycle, when each of the sizes of the height and width of the coding unit is greater than the maximum transform size, the video decoding apparatus 1900 may allow that smaller coding units are to be generated by performing a quadtree split on the coding unit.

Also, according to an embodiment, the video decoding apparatus 1900 may pre-determine a maximum value and a minimum value to restrict a size of the largest coding unit or the coding unit, based on information obtained from the bitstream.

In operation 2010, according to an embodiment, the video decoding apparatus 1900 may split the image into largest coding units having a constant size and decode the image. Because the size of the largest coding unit has been previously determined by the video encoding apparatus 1700, the video decoding apparatus 1900 may obtain, from the SPS, information about the size of the largest coding unit. According to an embodiment, the size of the largest coding unit may be 128×128.

According to an embodiment, the video decoding apparatus 1900 may separately obtain, from the bitstream, information about a maximum size and a minimum size of the coding unit based on a type of a slice.

In detail, the video decoding apparatus 1900 may obtain, from the bitstream, information about a minimum size of the luma coding unit and information about a difference between maximum and minimum sizes of the luma coding unit generated by performing a binary split on an intra slice. By using the information about the minimum size of the luma coding unit and the information about the difference between the maximum and minimum sizes of the luma coding unit generated by performing the binary split on the intra slice, the video decoding apparatus 1900 may determine the maximum size of the luma coding unit generated by performing the binary split on the intra slice. Also, the video decoding apparatus 1900 may obtain, from the SPS, the encoded information about the minimum size of the luma coding unit and the information about the difference between the maximum and minimum sizes of the luma coding unit generated by performing the binary split on the intra slice.

In detail, the video decoding apparatus 1900 may obtain, from the bitstream, information about a difference between maximum and minimum sizes of a luma coding unit generated by performing a ternary split on an intra slice. By using the information about the minimum size of the luma coding unit and the information about the difference between the maximum and minimum sizes of the luma coding unit generated by performing the ternary split on the intra slice, the video decoding apparatus 1900 may determine the maximum size of the luma coding unit generated by performing the ternary split on the intra slice. Also, the video decoding apparatus 1900 may obtain, from the SPS, the information about the difference between the maximum and minimum sizes of the luma coding unit generated by performing the ternary split on the intra slice.

In detail, the video decoding apparatus 1900 may obtain, from the bitstream, information about a difference between maximum and minimum sizes of a luma coding unit generated by performing a binary split on an inter slice. By using the information about the minimum size of the luma coding unit and the information about the difference between the maximum and minimum sizes of the luma coding unit generated by performing the binary split on the inter slice, the video decoding apparatus 1900 may determine the maximum size of the luma coding unit generated by performing the binary split on the inter slice. Also, the video decoding apparatus 1900 may obtain, from the SPS, the information about the difference between the maximum and minimum sizes of the luma coding unit generated by performing the binary split on the inter slice.

In detail, the video decoding apparatus 1900 may obtain, from the bitstream, information about a difference between maximum and minimum sizes of a luma coding unit generated by performing a ternary split on an inter slice. By using the information about the minimum size of the luma coding unit and the information about the difference between the maximum and minimum sizes of the luma coding unit generated by performing the ternary split on the inter slice, the video decoding apparatus 1900 may determine the maximum size of the luma coding unit generated by performing the ternary split on the inter slice. Also, the video decoding apparatus 1900 may obtain, from the SPS, the information about the difference between the maximum and minimum sizes of the luma coding unit generated by performing the ternary split on the inter slice.

According to an embodiment, the video decoding apparatus 1900 may determine whether a luma coding unit and a chroma coding unit are separately determined, based on the information obtained from the bitstream. In detail, the video decoding apparatus 1900 may obtain, from the SPS, information indicating whether the luma coding unit and the chroma coding unit are separately determined.

In detail, when the luma coding unit and the chroma coding unit are separately determined, the video decoding apparatus 1900 may obtain, from the bitstream, information about a difference between maximum and minimum sizes of a chroma coding unit generated by performing a binary split on an intra slice. By using the information about the minimum size of the chroma coding unit and the information about the difference between the maximum and minimum sizes of the chroma coding unit generated by performing the binary split on the intra slice, the video decoding apparatus 1900 may determine the maximum size of the chroma coding unit generated by performing the binary split on the intra slice. Also, the video decoding apparatus 1900 may obtain, from the SPS, the encoded information about the difference between the maximum and minimum sizes of the chroma coding unit generated by performing the binary split on the intra slice.

In detail, when the luma coding unit and the chroma coding unit are separately determined, the video decoding apparatus 1900 may obtain, from the bitstream, information about a difference between maximum and minimum sizes of a chroma coding unit generated by performing a ternary split on an intra slice. By using the information about the minimum size of the chroma coding unit and the information about the difference between the maximum and minimum sizes of the chroma coding unit generated by performing the ternary split on the intra slice, the video decoding apparatus 1900 may determine the maximum size of the chroma coding unit generated by performing the ternary split on the intra slice. Also, the video decoding apparatus 1900 may obtain, from the SPS, the information about the difference between the maximum and minimum sizes of the chroma coding unit generated by performing the ternary split on the intra slice.

According to an embodiment, when a coding unit is not adjacent to an outer boundary of an image, the video decoding apparatus 1900 may obtain, from the bitstream, the encoded split type information of the coding unit.

In detail, when the obtained split type information of the first coding unit indicates a binary split, the video decoding apparatus 1900 may determine two second coding units having a depth that is increased by 1 from a depth of the first coding unit. For example, when the depth of the first coding unit is N, the depth of each of the two second coding units generated by performing the binary split on the first coding unit may be N+1. In this regard, an area of each of the second coding units may be ½ of an area of the first coding unit.

In detail, when the obtained split type information of the first coding unit indicates a ternary split, the video decoding apparatus 1900 may determine a third coding unit having a depth that is increased by 1 from the depth of the first coding unit and two fourth coding units each having a depth that is increased by 2 from the depth of the first coding unit. For example, when the depth of the first coding unit is N, the depth of the third coding unit may be N+1, and the depth of each of the two fourth coding units may be N+2, the third coding unit and the fourth coding units being generated by performing the ternary split on the first coding unit. In this regard, an area of the third coding unit may be ½ of the area of the first coding unit, and an area of each of the fourth coding units may be ¼ of the area of the first coding unit.

Hereinbelow, combinations of pipeline data units that may be used by the video encoding apparatus 1700 and the video decoding apparatus 1900 will be described with reference to FIGS. 21 through 28.

Figure 21:
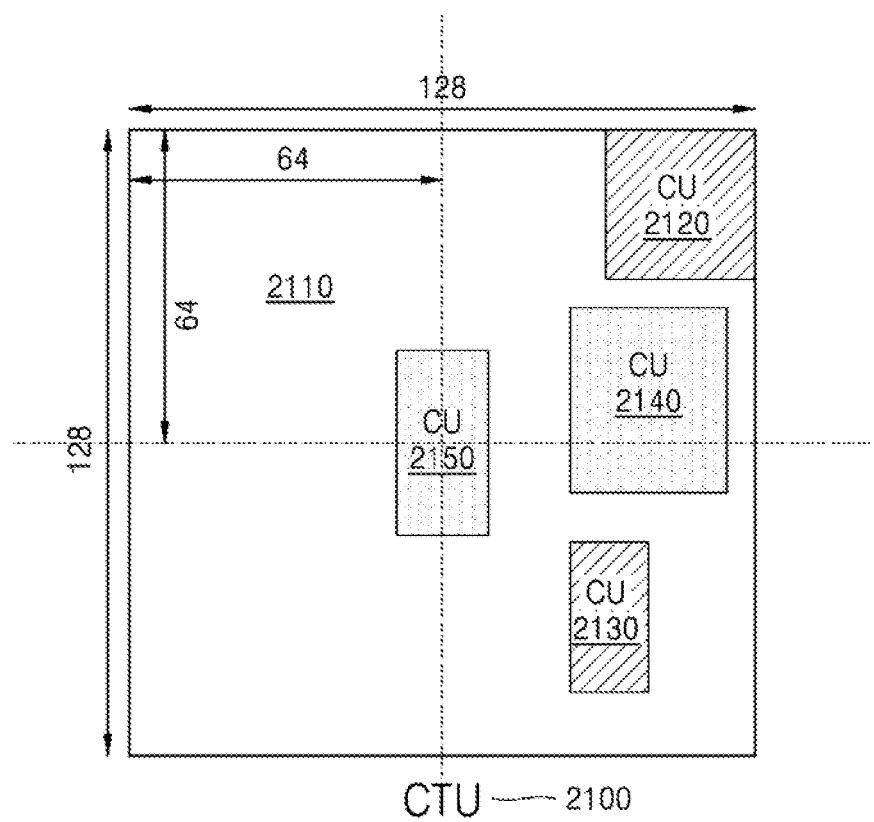
FIG. 21 illustrates a relationship among a largest coding unit, a pipeline data unit, and a block, according to an embodiment.

FIG. 21 illustrates a relationship among a largest coding unit, a pipeline data unit, and a block, according to an embodiment.

A partitioning method may be defined in consideration of a hardware design in a video coding method of performing partitioning on a coding unit using a quadtree split, a binary split, and a ternary split. For example, in the conventional video codec standards a size of a largest coding unit (coding tree unit (CTU)) is 64×64, and accordingly, a size of a pipeline data unit is also set to 64×64. However, in some codecs that are currently being standardized, the size of the largest coding unit (CTU) 2100 may be determined up to 128×128. This means an increase in a memory size or cache size, as compared to the conventional codec standards. Accordingly, in some codecs that are currently being standardized, block partitioning rules are restricted to have a pipeline data unit 2110 having a size of 64×64. In detail, the constraints have been placed not to allow a ternary split in blocks having a size greater than 64×64 (width>64 or height>64), and to allow a ternary split only in blocks with a ratio of 1:2 or 2:1 among the blocks having a size greater than 64×64 (that is, only blocks having sizes of 128×128, 128×64, and 64×128 are allowed). Because the current maximum transform size is 64 (that is, the size of the maximum transform unit is 64×64), partitioning into blocks greater than the pipeline data unit 2110 having a size of 64×64 may be allowed.

Also, in order to complete an encoding or decoding process on the coding unit during a pipeline cycle of the pipeline data unit 2110, the coding unit needs to be located in the pipeline data unit 2110, not across a boundary line of the pipeline data units 2110 (hereinbelow, referred to as the pipeline boundary line). Although coding units 2120 and 2130 are located in pipeline data units 2110, coding units 2140 and 2150 are across the pipeline boundary line, and thus it is difficult for the encoding or decoding process to be completed within one pipeline cycle.

According to an embodiment, in order for transformation/inverse transformation performed based on a transform unit to be completed during a pipeline cycle, it is preferable that the transform unit is located in the pipeline data unit 2110. In particular, a transform unit across the pipeline boundary line is not allowed. Accordingly, according to an embodiment, the video encoding apparatus 1700 and the video decoding apparatus 1900 may disallow determination of the transform unit from the coding unit. To this end, the video encoding apparatus 1700 and the video decoding apparatus 1900 may determine the size of the maximum transform unit to be 64×64, which is the size of the pipeline data unit, and to be less than or equal to the size of the coding unit.

According to an embodiment, the video encoding apparatus 1700 and the video decoding apparatus 1900 may determine a transform unit that is not across the pipeline boundary line, by splitting the transform unit across the pipeline boundary line into smaller sizes. However, there is a problem in that partitioning of the transform unit needs to be changed according to locations of the pipeline boundary line and the coding unit, and a shape of the coding unit.

According to another embodiment, when the coding unit is across the pipeline boundary line, the video encoding apparatus 1700 may not be able to perform transformation on a corresponding block within the pipeline cycle, and thus may be able to encode the block without residual data. That is, because the coding unit is a coding unit that does not include residual data, it is not necessary to determine the transform unit.

According to an embodiment, the video encoding apparatus 1700 may set a coding mode of the coding unit across the pipeline boundary line as a skip mode and encode the coding unit without encoding the residual data. In response to this, the video decoding apparatus 1900 may determine the coding mode of the coding unit across the pipeline boundary line as the skip mode and decode the coding unit without decoding the residual data. Also, the coding mode of the coding unit across the pipeline boundary line is limited only to the skip mode, and other coding modes may be disallowed.

According to another embodiment, even though the coding mode of the coding unit across the pipeline boundary line is a mode other than the skip mode, the video encoding apparatus 1700 may encode the coding unit without the residual data by setting a coded block flag (cbf) of the coding unit or the transform unit to 0. In response to this, the video decoding apparatus 1900 may determine the coding mode of the coding unit across the pipeline boundary line to have a cbf of 0 regardless of the coding mode and decode the coding unit without decoding the residual data.

Accordingly, the video encoding apparatus 1700 may set the coding mode of the block (coding unit or the transform unit) across the pipeline boundary line to a mode capable of processing without residual data, so as to encode the corresponding block (coding unit or transform unit). Similarly, the video decoding apparatus 1900 may determine the coding mode of the block (coding unit or transform unit) across the pipeline boundary line to a mode capable of processing without residual data, so as to decode the corresponding block (coding unit or the transform unit).

Also, in a subblock-based prediction method, an entire block is set as a motion vector estimation range, and thus the video encoding apparatus 1700 and the video decoding apparatus 1900 may not be able to apply the subblock-based prediction method to the coding unit across the pipeline boundary line. Accordingly, the subblock-based prediction method, such as an affine skip method, is not applicable to the coding unit across the pipeline boundary line.

However, as an exceptional case, a problem due to the pipeline method does not occur in a largest coding unit across an outline of an image. Therefore, a restriction of disallowing residual data at a pipeline boundary may not be applied to the largest coding unit across the outline of the image.

In FIG. 21, only the case where the pipeline data unit has a size of 64×64 has been described above. However, there is a disadvantage in that coding performance is degraded by restricting the pipeline data unit to only square blocks. Therefore, hereinbelow, in FIGS. 22 to 28, provided is a method of increasing coding performance by allowing various shapes of pipeline data units, such as square and non-square shapes, but maintaining the size (area) of the pipeline data unit as 64*64=4096. Because the various shapes of the pipeline data units require an operation for memory addressing, implementation complexity may increase, whereas coding performance may increase. Therefore, in selecting a type of a pipeline, an optimal pipeline data unit may be selected in consideration of coding performance and an amount of operation. Embodiments of allowable combinations of pipeline data units will be shown below in FIGS. 22 to 28.

Figure 22:
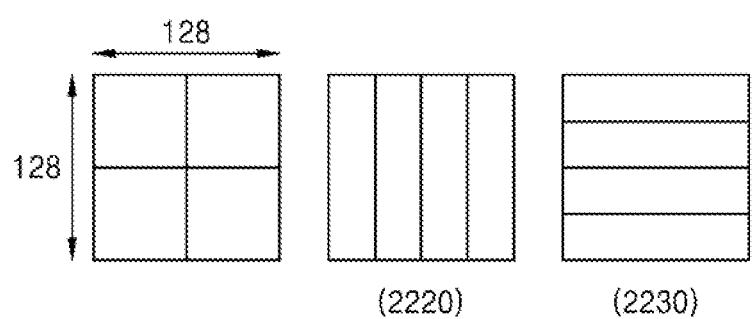
FIG. 22 illustrates three shapes of combinations of pipeline data units that are determinable from a largest coding unit, in consideration of a size of a pipeline data unit, according to an embodiment.

FIG. 22 illustrates three shapes of combinations of pipeline data units that are determinable from a largest coding unit, in consideration of a size of a pipeline data unit, according to an embodiment.

As shown in FIG. 22, allowable combinations of pipeline data units may include three shapes of pipeline data units. That is, a 128×128-sized largest coding unit may include a combination 2210 of four 64×64-sized pipeline data units, a combination 2220 of four 32×128-sized pipeline data units, and a combination 2230 of four 128×32-sized pipeline data units. In this case, for example, a ternary split may not be allowed in 128×128, 128×64, and 64×128-sized blocks.

When a 128×128-sized block is vertically split and its first 64×128-sized block is vertically binary split, its second 64×128-sized block may be vertically binary split unconditionally (a horizontal binary split and non-split may not be allowed in the second 64×128-sized block). When the first 64×128-sized block is not split or is horizontally binary split, a vertical binary split may not be allowed in the second 64×128-sized block.

Also, when the 128×128-sized block is horizontally split and its first 128×64-sized block is horizontally binary split, its second 128×64-sized block may be horizontally binary split unconditionally (a vertical binary split and non-split may not be allowed in the second 128×64-sized block). When the first 128×64-sized block is not split or is vertically binary split, a horizontal binary split may not be allowed in the second 128×64-sized block.

Figure 23:
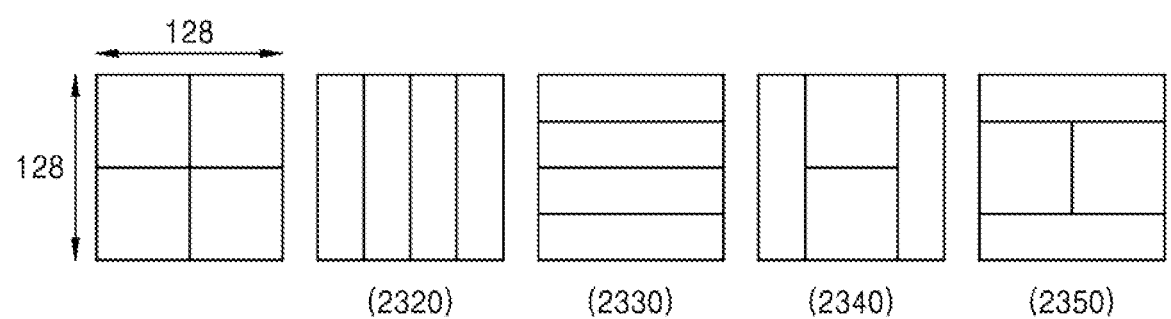
FIG. 23 illustrates five shapes of combinations of pipeline data units that are determinable from a largest coding unit, in consideration of a size of a pipeline data unit, according to an embodiment.

FIG. 23 illustrates five shapes of combinations of pipeline data units that are determinable from a largest coding unit, in consideration of a size of a pipeline data unit, according to an embodiment.

As shown in FIG. 23, allowable combinations of pipeline data units may include five shapes of pipeline data units. In this case, for example, it may be considered that the constraints in the embodiment of FIG. 22 are changed so that a ternary split is allowed in a 128×128-sized block. In this case, when the 128×128-sized block is ternary split and its central block is binary split, a binary split in a same direction as a direction of the ternary split may be allowed in the central block. When allowed, combinations 2320 and 2330 of four rectangular pipeline data units having a same size may be determined.

However, when the 128×128-sized block is ternary split and the central block is binary split, a binary split in a same direction as the direction of the ternary split may not be allowed in the central block. In this case, pipeline data units of a combination 2340 or 2350 in FIG. 23 may be used.

Figure 24:
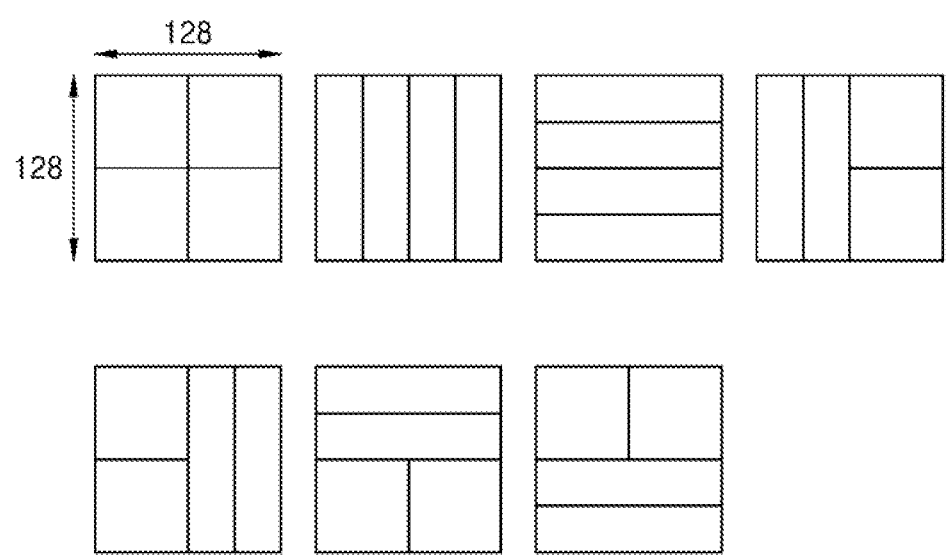
FIG. 24 illustrates seven shapes of combinations of pipeline data units that are determinable from a largest coding unit, in consideration of a size of a pipeline data unit, according to an embodiment.

FIG. 24 illustrates seven shapes of combinations of pipeline data units that are determinable from a largest coding unit, in consideration of a size of a pipeline data unit, according to an embodiment.

As shown in FIG. 24, allowable combinations of pipeline data units may include seven shapes of pipeline data units. According to an embodiment, when a ternary split is not allowed in 128×128, 128×64, and 64×128-sized blocks, combinations of FIG. 24 may be determined.

Figure 25:
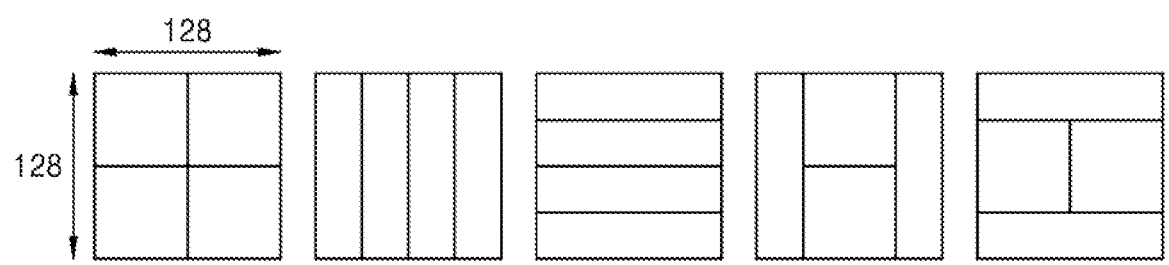
FIG. 25 illustrates nine shapes of combinations of pipeline data units that are determinable from a largest coding unit, in consideration of a size of a pipeline data unit, according to another embodiment.
Figure 25:
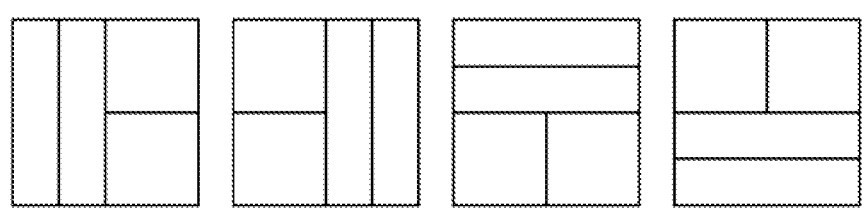

FIG. 25 illustrates nine shapes of combinations of pipeline data units that are determinable from a largest coding unit, in consideration of a size of a pipeline data unit, according to another embodiment.

As shown in FIG. 25, allowable combinations of pipeline data units may include nine shapes of pipeline data units. According to an embodiment, when a ternary split is allowed in a 128×128-sized block and is not allowed in 128×128-sized blocks and 64×128-sized blocks, combinations of FIG. 25 may be determined.

Figure 26:
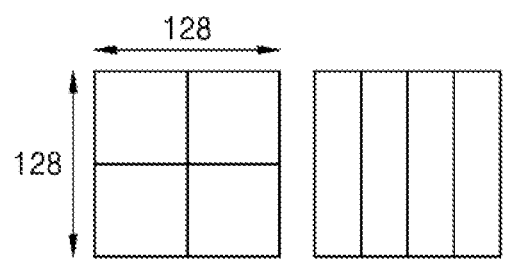
FIG. 26 illustrates two shapes of combinations of pipeline data units that are determinable from a largest coding unit, in consideration of a size of a pipeline data unit, according to an embodiment.

FIG. 26 illustrates two shapes of combinations of pipeline data units that are determinable from a largest coding unit, in consideration of a size of a pipeline data unit, according to an embodiment.

As shown in FIG. 26, allowable combinations of pipeline data units may include two shapes of pipeline data units. According to an embodiment, when a ternary split is not allowed in 128×128, 128×64, and 64×128-sized blocks and only a vertical binary split is allowed in the 128×128-sized block, combinations of FIG. 26 may be determined. When the 128×128-sized block is vertically split and its first 64×128-sized block is vertically binary split, its second 64×128-sized block may be vertically binary split unconditionally. A horizontal binary split and non-split may not be allowed in the second 64×128-sized block.

Figure 27:
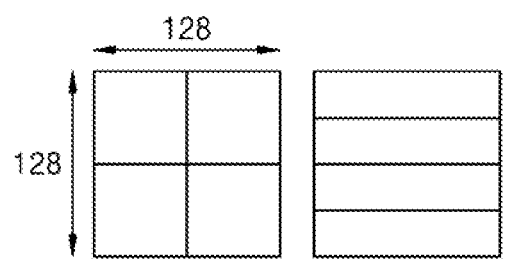
FIG. 27 illustrates two shapes of combinations of pipeline data units that are determinable only by a quadtree split or a binary split from a largest coding unit, in consideration of a size of a pipeline data unit, according to an embodiment.

FIG. 27 illustrates two shapes of combinations of pipeline data units that are determinable only by a quadtree split or a binary split from a largest coding unit, in consideration of a size of a pipeline data unit, according to an embodiment.

As shown in FIG. 27, allowable combinations of pipeline data units may include two shapes of pipeline data units. For example, a ternary split may not be allowed in 128×128, 128×64, and 64×128-sized blocks and only a vertical binary split may be allowed in the 128×128-sized block. When the 128×128-sized block is horizontally split and its first 128×64-sized block is horizontally binary split, its second 128×64-sized block may be horizontally binary split unconditionally (a vertical binary split and non-split may not be allowed in the second 128×64-sized block).

Figure 28:
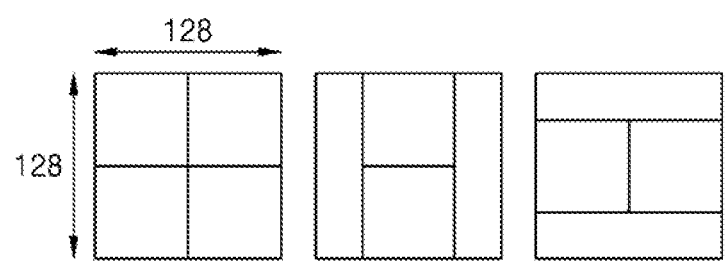
FIG. 28 illustrates three shapes of combinations of pipeline data units that are determinable by a quadtree split, a ternary split, and a binary split from a largest coding unit, in consideration of a size of a pipeline data unit, according to an embodiment.

FIG. 28 illustrates three shapes of combinations of pipeline data units that are determinable by a quadtree split, a ternary split, and a binary split from a largest coding unit, in consideration of a size of a pipeline data unit, according to an embodiment.

As shown in FIG. 28, allowable combinations of pipeline data units may include two shapes of pipeline data units. When a ternary split is allowed in a 128×128-sized block, and thus the 128×128-sized block is ternary split and its central block is binary split, a binary split in a same direction as a direction of the ternary split may not be allowed in the central block. In this case, a combination of a pipeline data unit may be selected from among three combinations, depending on whether the ternary split is allowed, and a split direction.

Various shapes of pipeline data units have been described above with reference to FIGS. 21 to 28. However, in addition to the above-described embodiments, the pipeline data units may be configured with any combination that is easily modifiable by one of ordinary skill in the art.

Even though the shapes of allowable pipeline data units vary according to the various cases described above, it remains the same that residual data of a block across a pipeline boundary line is not processed. Hereinbelow, a method of determining whether a current block is across a pipeline boundary line will be described with reference to FIG. 29.

FIG. 29 illustrates a function for determining whether a coding unit is located at a boundary line of a pipeline data unit, according to an embodiment.

In the function of FIG. 29, a size of the pipeline data unit is 64×64, coordinates of an upper-left sample of the current block is (x, y), and a height and width of the current block is h and w, respectively.

When a right boundary of the current block is outside of a right boundary line of the pipeline data unit (if (left_pipeline_boundary+64<x+w)), it may be determined that the current block is across the boundary line of the pipeline data unit (result=true).

When a lower boundary of the current block is outside of a lower boundary line of the pipeline data unit (if (left_pipeline_boundary+64<x+w)), it may be determined that the current block is across the boundary line of the pipeline data unit (result=true).

When a size of the current block is 128×128 (if (w==128 && h==128)), it may be determined that the current block is not across the boundary line of the pipeline data unit (result=false).

When the width of the current block is 64 and the height of the current block is 128 (if (w==64 && h==128 && (w % 64)==0)), it may be determined that the current block is not across the boundary line of the pipeline data unit (result=false).

When the height of the current block is 64 and the width of the current block is 128 (if (h==64 && w==128 && (h % 64)==0)), it may be determined that the current block is not across the boundary line of the pipeline data unit (result=false).

When the right boundary or the lower boundary of the current block is outside of the outline of the image (if ((x+128)>pic_w||(y+128)>pic_h)), it may be determined that the current block is not across the boundary line of the pipeline data unit (result=false).

Hereinbelow, various embodiments will be described, in which the video encoding apparatus 1700 and the video decoding apparatus 1900 signal information about maximum sizes, minimum sizes, and differences between the maximum and minimum sizes of various blocks used for video encoding and decoding.

A size of a largest coding unit and a minimum size of a coding unit independent from a split mode may be defined. Until the minimum size of the coding unit is reached, the coding unit may be recursively partitioned by using splitting methods of various partitioning types (quadtree split, binary split, and ternary split types). That is, when performing recursive partitioning, whether a current coding unit is additionally splittable into sub-coding units may be determined by comparing a size of the current coding unit with the minimum size of the coding unit. For example, when identifying whether to perform a quadtree split, in a case where, in a case where the quadtree split is performed on the current coding unit and a size of the sub-coding unit becomes less than the minimum size of the coding unit, the quadtree split may not be performed. As another example, when identifying whether to perform the quadtree split, in a case where, when a binary split in a specific direction is performed on the current coding unit, a length of a corresponding side of a sub-coding unit in a split direction becomes less than the minimum size of the coding unit, the binary split in the specific direction may not be performed. As another example, when identifying whether to perform a ternary split, in a case where, when a ternary split in a specific direction is performed on the current coding unit, a length of a corresponding side of a sub-coding unit in a split direction becomes less than the minimum size of the coding unit, the ternary split in the specific direction may not be performed.

In this regard, information about the minimum size of the coding unit may be predefined by the video encoding apparatus 1700 and the video decoding apparatus 1900. The video encoding apparatus 1700 may encode the information about the minimum size of the coding unit and include the encoded information in a sequence header, an SPS, a picture header, a picture parameter set (PPS), or a slice header. In response to this, the video decoding apparatus 1900 may obtain the information about the minimum size of the coding unit from the sequence header, the SPS, the picture header, the PPS, or the slice header.

As a specific example, the minimum size of the coding unit may be 4. Also, a value of log 2 of the minimum size of the coding unit may be encoded. That is, when the minimum size of the coding unit is 4, a value corresponding to log 2 of the coding unit is 2, and when −2 is applied thereto, a result value may be 0. By applying −2 to the value of log 2 of the minimum size of the coding unit and then signaling a resultant value, coding efficiency of the information about the minimum size of the coding unit may be increased. In this regard, a fixed length coding (FLC) method or a variable length coding (VLC) method may be used as a coding method for the information about the minimum size of the coding unit. In this case, when the VLC method is used, an unsigned exponential Golomb code method may be used. As another example, when the minimum size of the coding unit is 8, a resultant value may be signaled by applying −2 to the value (3) corresponding to the log 2 and setting the value as 1.

Split depths (indicating how many times to allow recursive splitting in a corresponding type) allowed for various split types (quadtree split, binary split, ternary split types) may also be separately set for each split type. When the video encoding apparatus 1700 and the video decoding apparatus 1900 support a quadtree split, a binary split, and a ternary split, for example, a split depth allowed for the quadtree split, a split depth allowed for the binary split, and a split depth allowed for the ternary split may be set. As another example, the split depth allowed for the quadtree split and the split depths allowed for the binary split and the ternary split may also be defined. In this case, the split depths allowed for the binary split and the ternary split may be set equally. As another example, split depths allowed for the quadtree split, the binary split, and the ternary split may be set as a single split depth.

In the aforementioned embodiment in which the split depth is preset, the concept of a depth may be considered as the concept of an area. For example, when a block is split and thus an area of its subblock is 1/N, a depth of the subblock may be set to increase by 1 from a depth of the block. For example, in case of N=2, when two M/2×M blocks are determined by performing a binary split on an M×M block (depth=0), an area of each of the M/2×M blocks is 1/N, that is, ½, so that a depth of each of the M/2×M blocks increases by 1 and thus may be 1. Also, when four M/2×M/2 blocks are determined by performing a quadtree split on the M×M block (depth=0), an area of each of the M/2×M/2 blocks is 1/N*1/N, that is, ½*½=¼, so that a depth of each of the M/2×M/2 increases by 2 and thus may be determined as 2. Moreover, when two M/4×M blocks and one M/2×M block are determined by performing the ternary split on the M×M block (depth=0), a depth of each of the M/4×M blocks increases by 2 and thus may be determined as 2, and a depth of the M/2×M block increases by 1 and thus may be determined as 1. Also, depending on a partitioning method, depth information may be separately set.

Additionally, there is a module performing a specific operation by comparing depth information of an adjacent block and depth information of a current block, and a depth configuration method in a corresponding partitioning method may be used. For example, context-based adaptive binary arithmetic code (CABAC) context may be determined by comparing a depth of the current block and a depth of the adjacent block. The embodiments are not limited to a depth for a specific split mode, and the depth of the current block and the depth of the adjacent block are compared based on an actual split area or a block size, so that more accurate context may be determined.

Assuming that allowable split depths for the binary split and the ternary split are the same as each other and the allowable split depths are N, in case of the binary split, when a current depth is D, a depth of each subblock is D+1. However, in case of the ternary split, because areas of subblocks are different from each other, depths of first and third subblocks are determined as D+2, and a depth of a third (middle) subblock is determined as D+1. In this regard, when the allowable split depth (N) is D+3, one additional split may be performed on the first and third subblocks, and two additional splits may be performed on the second subblock. As another example, one additional split may be performed on the first and third subblocks, but only a split mode to increase the depth of the subblock by 1 may be allowed. That is, because there is a split mode which increases the depth of the subblock by 2 when performing a ternary split on the corresponding subblock, the ternary split may not be used, and a split mode which increases the depth of the subblock by 1, such as a binary split, may be allowed. That is, depths of blocks that are leaf nodes may be set not to exceed a value of the split depth.

According to an embodiment, the video encoding apparatus 1700 and the video decoding apparatus 1900 may pre-set only the maximum size and the minimum size of the coding unit and may not signal an allowable split depth. In this case, allowable split depths for a quadtree split, a binary split, and a ternary split are up to the minimum size of the coding unit is reached, and a specially allowed split depth is not signaled. However, even in this case, information about the split depth may be stored in a storage for execution of other modules.

In a partitioning structure in which a binary split and a ternary split are allowed, when a constraint is placed on the maximum size of the coding unit for each of a binary split and a ternary split (for example, when a binary split or a ternary split is not performed at a size greater than the maximum size of the coding unit), a value of the maximum size of the coding unit for a ternary split may be set to be always equal to or less than a value of the maximum size of the coding unit for a binary split. As a specific example, when the value of the maximum size of the coding unit for a binary split is 64, the value of the maximum size of the coding unit for a ternary split may be equal to or less than 64, which is 32.

According to an embodiment, the video encoding apparatus 1700 and the video decoding apparatus 1900 may allow a binary split and a ternary split only in coding units having a fixed size or less, by pre-setting the maximum size of the coding unit for a binary split and a ternary split. As a specific example, a binary split and a ternary split may always be allowed only on sides having a length of 64 or less.

According to an embodiment, the video encoding apparatus 1700 and the video decoding apparatus 1900 may use a maximum transform size as a reference when designing a hardware pipeline. In this case, a constraint may be placed on partitioning so that the number of blocks greater than the maximum transform size with respect to a longer side of a block does not exceed (maximum size of coding unit)/ (maximum transform size) within a largest coding unit. For example, when the maximum size of the coding unit is 128 and the maximum transform size is 64, in a 128×128-sized largest coding unit, 128/64, that is, up to two blocks, each of which has at least two sides having a length of 128 which is greater than 64, may be allowed. Here, because the block of which sides have a length of 128 has a maximum transform size of 64, transformation should be performed by splitting one side of the block having a length of 128. That is, because the block of which sides have a length of 128 includes two transform blocks having the maximum transform size, two pipeline data units are required for the pipeline design, and thus up to two blocks may be allowed by default. In detail, when performing a ternary split on the 128×128-sized largest coding unit at a ratio of 1:2:1, three blocks of which sides have a length of 128 are generated, and thus such a ternary split may not be allowed. Alternatively, when performing a horizontal binary split on, once more, each subblock (128×64) generated by performing a vertical binary split on the 128×128-sized largest coding unit at a ratio of 1:1, three or more blocks of which sides have a length of 128 are generated, and thus a binary split may not be allowed for such subblocks.

In a block structure in which partitioning is performed using a quadtree split, a binary split, and a ternary split, with respect to the maximum transform size, the ternary split may not be allowed for a block having sides greater than the maximum transform size and may be allowed only for a block with a width-to-height ratio of 1:1, 1:2, and 2:1. As a specific example, when the maximum transform size is 64, a ternary split is not allowed for a 128×128-sized block by default and is allowed only for a block with a width-to-height ratio of 1:1, 1:2, and 2:1. Accordingly, because a binary split subblock (a block with a height-to-width ratio of 1:2 or 2:1, that is, a 128×64-sized or 64×128-sized block) already has a ratio of 1:2 or 2:1, a binary split which splits longer sides may be allowed.

In a structure in which partitioning using a binary split and a ternary split is allowed for a block generated by a quadtree split, an allowable split depth for a binary split and a ternary split may be defined. In this case, the allowable split depth for a binary split and a ternary split may be defined depending on a depth of a quadtree split (or a block size of the block generated by a quadtree split). For example, when a depth of the block generated by the quadtree split is between 0 and 2, the allowable split depth for a binary split and a ternary split in the block generated by the quadtree split may be determined as 2. When the depth of the block generated by the quadtree split is between 3 and a last depth, or a minimum size allowable for the block generated by the quadtree split, the allowable split depth for a binary split and a ternary split may be set to 3.

As another example, when the depth of the block generated by the quadtree split is between 0 and 2, the allowable split depth for a binary split and a ternary split may be set to 3. When the depth of the block generated by the quadtree split is between 3 and the last depth, or the minimum size allowable for the block generated by the quadtree split, the allowable split depth for a binary split and a ternary split may be set to 2.

In a method of independently partitioning a luma block and a chroma block, split information about the luma block and split information about the chroma block may be transmitted, respectively. In the above method, the video decoding apparatus 1900 may equally apply a parameter for determining a partitioning method of the luma block, to a partitioning method of the chroma block. As another example, parameters for the partitioning methods of the luma block and the chroma block are separately signaled, so that different partitioning methods may be performed.

Hereinbelow, a specific example will be given with respect to a size of a picture sample unit. A maximum size of a binary splittable coding unit may be determined to be the same for the luma block and the chroma block. In this regard, the maximum size of the binary splittable coding unit may be a value pre-agreed by the video encoding apparatus 1700 and the video decoding apparatus 1900, or may be a value signaled through a header. A value determined in units of a sequence may be used together in an intra slice and an inter slice, or a value determined in units of a slice by signaling for each slice may be used together.

As another example, the maximum size of the binary splittable coding unit may be differently determined for each luma block and each chroma block. In this regard, the maximum size of the binary splittable coding unit may be a value pre-agreed by the video encoding apparatus 1700 and the video decoding apparatus 1900, or may be a value signaled through the header. In this case, in units of a picture sample, a maximum size of a binary splittable chroma block may be greater than a maximum size of a binary splittable luma block.

As another example, in the method of independently partitioning the luma block and the chroma block, when the maximum size of the binary splittable coding unit is determined in units of a signaled picture sample, the maximum size may be interpreted according to an actual luma block and chroma block. For example, when a 4:2:0 YUV color format is used and the maximum size of the binary splittable coding unit is determined as 32, the maximum size of the binary splittable coding unit may be applied in units of a luma sample in partitioning of the luma block, and the maximum size of the binary splittable coding unit may be applied in units of a chroma sample in partitioning of the chroma block. In this case, in the partitioning of the chroma block, a parameter corresponding to a size that is twice a width and height of the luma block with respect to the picture sample is applied.

In the above embodiment, the video encoding apparatus 1700 and the video decoding apparatus 1900 may perform signaling for the maximum size of the binary splittable coding unit and a maximum size of a ternary splittable coding unit in an integrated manner.

Hereinbelow, embodiments related to partitioning methods of blocks, which may be used by the video encoding apparatus 1700 and the video decoding apparatus 1900, are listed.

In the method of independently partitioning the luma block and the chroma block, the parameters for partitioning methods of the luma block and the chroma block may be signaled in an integrated manner for the luma block and the chroma block, and the partitioning methods may also be shared between the luma block and the chroma block.

Parameters for partitioning methods in an intra slice and an inter slice may be integrated and then signaled, and the partitioning methods may be shared between the intra slice and the inter slice. By setting the parameters in units of a sequence, a corresponding partitioning method may be shared in all pictures.

When the maximum size of the coding unit is 128×128, a block having a maximum size, a binary split of which is allowed, may be fixedly determined as a 64×64-sized coding unit in the intra slice. Additionally, a block having a ternary splittable maximum size may be determined as a 64×64 coding unit in the same manner as a binary split or may be determined as a 32×32-sized coding unit, which corresponds to ¼ of 128×128. A block having a maximum size, a binary split of which is allowed, may be fixedly determined as a 128×128-sized coding unit in the inter slice. Additionally, a block having a ternary splittable maximum size may be determined as a 128×128 coding unit in the same manner as a binary split or may be determined as a 64×64-sized coding unit, which corresponds to ¼ of 128×128.

The maximum size of the ternary splittable coding unit may be determined based on the maximum size of the binary splittable coding unit. For example, a size corresponding to ¼ of the maximum size of the binary splittable coding unit may be determined as the maximum size of the ternary splittable coding unit. When the maximum size of the binary splittable coding unit is M×N, the maximum size of the ternary splittable coding unit may be M/2×N/2. That is, the maximum size of the ternary splittable coding unit may be determined based on signaling of the maximum size of the binary splittable coding unit.

According to an embodiment, the video encoding apparatus 1700 and the video decoding apparatus 1900 may fixedly set the maximum size of the binary splittable coding unit and the maximum size of the ternary splittable coding unit without signaling. When the method of independently partitioning the luma block and the chroma block is applied, a maximum size of a binary splittable block and a maximum size of a ternary splittable block may also be fixedly set depending on a slice type. Additionally, the maximum size of the ternary splittable block may be determined equal to the maximum transform size. As a specific example, the maximum size of the binary splittable block may be set differently for the intra slice and the inter slice, but the maximum size of the binary splittable block in the intra slice may be set less than the maximum size of the binary splittable block in the inter slice.

Also, when the method of independently partitioning the luma block and the chroma block is applied, the maximum size of the binary splittable luma block may be set less than the maximum size of the binary splittable chroma block in the same slice. Similarly, a maximum size of a ternary splittable luma block may be set less than a maximum size of a ternary splittable chroma block in the same slice. As a specific example, the maximum size of the binary splittable block in the intra slice may be set to 32, and the maximum size of the binary splittable block in the inter slice may be set to 128.

When the method of independently partitioning the luma block and the chroma block is applied, a maximum size of a binary splittable chroma coding unit in the intra slice may be set to 64. Also, only splitting at a 1:2 or 2:1 ratio may be allowed for a coding unit of which sides have a length of 128.

For example, the video decoding apparatus 1900 may obtain the following parameters from a bitstream, and the video encoding apparatus 1700 may encode the following parameters and then transmit the encoded parameters which are included in the bitstream.

Maximum Size of a Coding Unit

Maximum size of a binary splittable coding unit (applicable to a luma block and a chroma block) (When a method of independently partitioning the luma block and the chroma block is applied, information about the maximum size of the binary splittable coding unit may be shared and used in the luma block and the chroma block.)

Maximum size of a ternary splittable coding unit (applicable to the luma block and the chroma block) (When the method of independently partitioning the luma block and the chroma block is applied, information about the maximum size of the ternary splittable coding unit may be shared and used in the luma block and the chroma block.)

As another example, the video decoding apparatus 1900 may obtain the following parameters from a bitstream, and the video decoding apparatus 1900 may encode the following parameters and then transmit the encoded parameters which are included in the bitstream.

Maximum Size of a Coding Unit

Maximum size of a binary splittable and ternary splittable coding unit (applicable to the luma block and the chroma block) (When the method of independently partitioning the luma block and the chroma block is applied, information about the maximum size of the binary splittable coding unit may be shared and used in the luma block and the chroma block.)

Further, as another example, the video decoding apparatus 1900 may obtain the following parameters from a bitstream, and the video decoding apparatus 1900 may encode the following parameters and then transmit the encoded parameters which are included in the bitstream.

Maximum Size of a Coding Unit

Maximum size of a binary splittable coding unit (applicable to the luma block and the chroma block) (The maximum size of the ternary splittable coding unit may be determined by using the maximum size of the binary splittable coding unit.)

Further, as another example, the video decoding apparatus 1900 may obtain the following parameters from a bitstream, and the video decoding apparatus 1900 may encode the following parameters and then transmit the encoded parameters which are included in the bitstream.

Maximum Size of a Coding Unit

Maximum size of a binary splittable and ternary splittable luma coding unit

When the method of independently partitioning the luma block and the chroma block is applied, a maximum size of a binary splittable and ternary splittable chroma coding unit When the method of independently partitioning the luma block and the chroma block is not applied, a maximum size of a binary splittable and ternary splittable luma coding unit may be applied to partitioning of the chroma coding unit.

Further, as another example, the video decoding apparatus 1900 may obtain the following parameters from a bitstream, and the video decoding apparatus 1900 may encode the following parameters and then transmit the encoded parameters which are included in the bitstream.

Maximum Size of a Coding Unit

Maximum size of a binary splittable luma coding unit

When the method of independently partitioning the luma block and the chroma block is applied, a maximum size of a binary splittable chroma coding unit When the method of independently partitioning the luma block and the chroma block is not applied, a maximum size of a binary splittable luma coding unit may be applied to partitioning of the chroma coding unit.

Maximum size of a ternary splittable luma coding unit

When the method of independently partitioning the luma block and the chroma block is applied, a maximum size of a ternary splittable chroma coding unit When the method of independently partitioning the luma block and the chroma block is not applied, a maximum size of a ternary splittable luma coding unit may be applied to partitioning of the chroma coding unit.

Further, as another example, the video decoding apparatus 1900 may obtain the following parameters from a bitstream, and the video decoding apparatus 1900 may encode the following parameters and then transmit the encoded parameters which are included in the bitstream.

Maximum Size of a Coding Unit

Maximum size of a binary splittable luma coding unit in an intra slice

When a method of independently partitioning the luma block and the chroma block in the intra slice is applied, a maximum size of a binary splittable chroma coding unit Maximum size of a ternary splittable luma coding unit in an intra slice When the method of independently partitioning the luma block and the chroma block in the intra slice is applied, a maximum size of a ternary splittable chroma coding unit Maximum size of a binary splittable luma coding unit in an inter slice When a method of independently partitioning the luma block and the chroma block in the inter slice is applied, a maximum size of a binary splittable chroma coding unit Maximum size of a ternary splittable luma coding unit in an inter slice When the method of independently partitioning the luma block and the chroma block in the inter slice is applied, a maximum size of a ternary splittable chroma coding unit In addition to the above embodiments, signaling for a minimum size of a coding unit may also be performed.

When various partitioning methods exist, a minimum size of a coding unit is not defined for each split mode, but a minimum size of a coding unit, which may be commonly used for various split modes, may be defined and signaled. In detail, the minimum size of the coding unit may be determined as M×N, such as 4×4 or the like. When M and N are the same as each other, only information about M may be signaled, and when M and N are different from each other, a value of M and a difference between M and N may be signaled (or a value of N and a difference between N and M may be signaled).

Also, a definition of a minimum size of a coding unit may be set for each inter block and each inter block. For example, a minimum size of a coding unit for an intra block (e.g., min_cu_size_intra), a value obtained by applying log 2 to the minimum size of the coding unit (e.g., log 2_min_cu_size_intra), or a value obtained by applying −2 to the log 2 value (e.g., log 2_min_cu_size_intra_minus2) may be signaled. Also, similarly to an inter block, a minimum size of a coding unit (e.g., min_cu_size_inter), a value obtained by applying log 2 to the minimum size of the coding unit (e.g., log 2_min_cu_size_inter), or a value obtained by applying −2 to the log 2 value (e.g., log 2_min_cu_size_inter minus2) may be signaled.

Also, information about a minimum size of a coding unit may be signaled for each split mode. For example, information about minimum sizes of coding units allowed for a quadtree split, a binary split, and a ternary split may be separately signaled, and a minimum size of a coding unit allowed for a quadtree split and a minimum size of a coding unit commonly allowed for a binary split and a ternary split may be signaled.

In addition to the above embodiments, an additionally allowed split depth may be defined for each split mode. A split depth allowed for a quadtree split (e.g., max_qp_depth), a split depth allowed for a ternary split (e.g., max_tt_depth), and a split depth allowed for a binary split (e.g., max_bt_depth) may be set and then signaled. As another example, a split depth commonly allowed for a binary split and a ternary split (e.g., max_btt_depth) may be set and then signaled.

As a specific embodiment, a size of the binary splittable coding unit in the intra slice may be configured as 64 (shared between the luma block and the chroma block), a size of the ternary splittable coding unit in the intra slice is configured as 32 (shared between the luma block and the chroma block), a size of the binary splittable coding unit in the inter slice may be configured as 128, and a size of the ternary splittable coding unit in the inter slice may be configured as 64.

As a specific embodiment, a maximum size of a binary splittable and ternary splittable coding unit in the intra slice may be configured as 32, and a maximum size of a binary splittable and ternary splittable coding unit in the inter slice may be configured as 64.

As a specific embodiment, the maximum size of the binary splittable and ternary splittable coding unit in the intra slice may be configured as 32, a maximum size of the binary splittable coding unit in the inter slice may be configured as 128, and the maximum size of the binary splittable coding unit in the inter slice may be configured as 64. For coding units having sizes from 128×128 to 64×64, it may be configured to allow only blocks with a height-to-width ratio of 1:2 or 2:1.

According to an embodiment, pseudo codes to be used by the video encoding apparatus 1700 and the video decoding apparatus 1900 for implementing the above embodiments in a pipeline structure are shown below. Hereinbelow, in the pseudo codes shown in Table 1, split modes BT, TT, and QT denote a binary split, a ternary split, and a quadtree split, respectively.

TABLE 1 max_tt_size // maximum size of ternary splittable coding unit
max_tt_size // maximum size of binary splittable coding unit
width // width of current coding unit
height // height of current coding unit
log2_width // log2(width)
log2_height // log2(height)
//(1. Test for ternary split in horizontal direction)
if(height > max_tt_size)
TT in horizontal direction is not allowed
else TABLE 1-continued TT in horizontal direction may be allowed // There may be additional conditions to determine whether a ternary split in a horizontal direction is allowed.
//(2. Test for ternary split in vertical direction)
if(width > max_tt_size)
TT in vertical direction is not allowed
else
TT in vertical direction may be allowed // There may be additional conditions to determine whether a ternary split in a vertical direction is allowed.
//(3. Test for binary split in horizontal direction)
if(abs(log2_height / 2 - log2_width) >1 && (height > 64 || width > 64))
BT in horizontal direction is not allowed
else
BT in horizontal direction is allowed // There may be additional conditions to determine whether a binary split in a horizontal direction is allowed.
//(4. Test for binary split in vertical direction)
if(abs(log2_width / 2 - log2_height) > 1 && (height > 64 || width > 64))
BT in vertical direction is not allowed
else
BT in vertical direction is not allowed // There may be additional conditions to determine whether a binary split in a vertical direction is allowed.
// End of Table 1

As another embodiment, tests 1 and 2 may be expressed as in Table 2. It may be set so that a ternary split is allowed only at a size of a coding unit (max_tt_size× max_tt_size) or less. As an example, in the test 1, even when a width of a current coding unit is greater than max_tt_size though a height of the coding unit is equal to or smaller than max_tt_size, the corresponding split mode may be allowed. However, in the case of Table 2 below, even when another side is greater than max_tt_size, the corresponding split mode may not be allowed.

TABLE 2

//(1. Test for ternary split in horizontal direction)
if(height > max_tt_size || width > max_tt_size)
TT in horizontal direction is not allowed
else
TT in horizontal direction may be allowed // There may be additional conditions to determine whether a ternary split in a horizontal direction is allowed.
//(2. Test for ternary split in vertical direction)
if(width > max_tt_size || height > max_tt_size)
TT in vertical direction is not allowed
else
TT in vertical direction may be allowed // There may be additional conditions to determine whether a ternary split in a vertical direction is allowed.
// End of Table 2

As another embodiment, tests 1 and 2 may be expressed as in Table 3. When a maximum size max_tt_size of a ternary splittable coding unit is smaller than N, it may be set so that a ternary split TT is allowed only at the size of the coding unit (N×N) or less. As a specific example, N may be 64. Additionally, in this case, a value of max_tt_size may be set to be less than or equal to N. As another example, in this regard, N may be set as the maximum transform size.

TABLE 3

//(1. Test for ternary split in horizontal direction)
if(height > max_tt_size in || width > N)
TT in horizontal direction is not allowed
else

TABLE 3-continued

TT in horizontal direction may be allowed // There may be additional conditions to determine whether a ternary split in a horizontal direction is allowed.
//(2. Test for ternary split in vertical direction)
if(width > max_tt_size || height > N)
TT in vertical direction is not allowed
else
TT in vertical direction may be allowed // There may be additional conditions to determine whether a ternary split in a vertical direction is allowed.
// End of Table 3

As another embodiment, tests 3 and 4 may be expressed as in Table 4.

TABLE 4

//(3. Test for binary split in horizontal direction)
if(width > height && width > 64)
BT in horizontal direction is not allowed
else
BT in horizontal direction may be allowed // There may be additional conditions to determine whether a binary split in a horizontal direction is allowed.
//(4. Test for binary split in vertical direction)
if(height > width && height > 64)
BT in vertical direction is not allowed
else
BT in vertical direction may be allowed // There may be additional conditions to determine whether a binary split in a vertical direction is allowed.
// End of Table 4

As another embodiment, tests 3 and 4 may be expressed as in Table 5.

TABLE 5

//(3. Test for binary split in horizontal direction)
if(width > 64 && width > height)
BT in horizontal direction is not allowed
else
BT in horizontal direction may be allowed // There may be additional conditions to determine whether a binary split in a horizontal direction is allowed.
//(4. Test for binary split in vertical direction)
if(height > 64 && height > width)
BT in vertical direction is not allowed
else
BT in vertical direction may be allowed // There may be additional conditions to determine whether a binary split in a vertical direction is allowed.
// End of Table 5

As another embodiment, tests 3 and 4 may be expressed as in Table 6.

TABLE 6

//(3. Test for binary split in horizontal direction)
if(width > 64 && log2_width − log2_height == 1)
BT in horizontal direction is not allowed
else
BT in horizontal direction may be allowed // There may be additional conditions to determine whether a binary split in a horizontal direction is allowed.
//(4. Test for binary split in vertical direction)
if(height > 64 && log2_height − log2_width == 1)
BT in vertical direction is not allowed
else
BT in vertical direction may be allowed // There may be additional conditions to determine whether a binary split in a vertical direction is allowed.
// End of Table 6

As another embodiment, tests 3 and 4 may be expressed as in Table 7.

TABLE 7

//(3. Test for binary split in horizontal direction)
if(width > 64 && width != height)
BT in horizontal direction is not allowed
else
BT in horizontal direction may be allowed // There may be additional conditions to determine whether a binary split in a horizontal direction is allowed.
//(4. Test for binary split in vertical direction)
if(height > 64 && height != width)
BT in vertical direction is not allowed
else
BT in vertical direction may be allowed // There may be additional conditions to determine whether a binary split in a vertical direction is allowed.
// End of Table 7

As another embodiment, tests 3 and 4 may be expressed as in Table 8.

TABLE 8

//(3. Test for binary split in horizontal direction)
if(width > 64 && width − height != 0)
BT in horizontal direction is not allowed
else
BT in horizontal direction may be allowed // There may be additional conditions to determine whether a binary split in a horizontal direction is allowed.
//(4. Test for binary split in vertical direction)
if(height > 64 && height − width != 0)
BT in vertical direction is not allowed
else
BT in vertical direction may be allowed // There may be additional conditions to determine whether a binary split in a vertical direction is allowed.
// End of Table 8

As another embodiment, tests 3 and 4 may be expressed as in Table 9. In the following embodiments, maximum transform size indicates a maximum transform size.

TABLE 9

//(3. Test for binary split in horizontal direction)
if(height == 64 && width == 128)
BT in horizontal direction is not allowed
else
BT in horizontal direction may be allowed // There may be additional conditions to determine whether a binary split in a horizontal direction is allowed.
//(4. Test for binary split in vertical direction)
if(height == 128 && width == 64)
BT in vertical direction is not allowed
else
BT in vertical direction may be allowed // There may be additional conditions to determine whether a binary split in a vertical direction is allowed.
// End of Table 9

As another embodiment, tests 3 and 4 may be expressed as in Table 10.

TABLE 10

//(3. Test for binary split in horizontal direction)
if(height == maximum transform size && width == CTU size)
BT in horizontal direction is not allowed
else TABLE 10-continued

```
    BT in horizontal direction may be allowed // There may be
additional conditions to determine whether a binary split in
a horizontal direction is allowed.
    //(4. Test for binary split in vertical direction)
    if(height == CTU size && width == maximum
transform size)
    BT in vertical direction is not allowed
    else
    BT in vertical direction may be allowed // There may be
additional conditions to determine whether a binary split
in a vertical direction is allowed.
    // End of Table 10
```

As another embodiment, tests 3 and 4 may be expressed as in Table 11.

TABLE 11

```
    //(3. Test for binary split in horizontal direction)
    if(height == maximum transform size && width >
maximum transform size)
    BT in horizontal direction is not allowed
    else
    BT in horizontal direction may be allowed // There may be
additional conditions to determine whether a binary split in
a horizontal direction is allowed.
    //(4. Test for binary split in vertical direction)
    if(height > maximum transform size && width ==
maximum transform size)
    BT in vertical direction is not allowed
    else
    BT in vertical direction may be allowed // There may be
additional conditions to determine whether a binary split in
a vertical direction is allowed.
    // End of Table 11
```

As another embodiment, tests 3 and 4 may be expressed as in Table 12.

TABLE 12

```
    //(3. Test for binary split in horizontal direction)
    if(height == 64 && width > 64)
    BT in horizontal direction is not allowed
    else
    BT in horizontal direction may be allowed // There may be
additional conditions to determine whether a binary split in
a horizontal direction is allowed.
    //(4. Test for binary split in vertical direction)
    if(height > 64 && width == 64)
    BT in vertical direction is not allowed
    else
    BT in vertical direction may be allowed // There may be
additional conditions to determine whether a binary split in
a vertical direction is allowed.
    // End of Table 12
```

In the above-described embodiments (Tables 1 through 12), it may be considered that various expression methods for designing the pipeline structure in units of a maximum transform size of 64×64 have been provided.

Similar to the above-described embodiments, a method of splitting a coding unit at an outline of an image may be determined in relation to the designing of the pipeline structure. When the coding unit is across the outline of the image, the coding unit may be arbitrarily split by using a binary split, and as shown in the aforementioned embodiments, the binary split may be allowed or disallowed under preset conditions. As another example, when both a quadtree split and a binary split are allowed at the outline of the image but the preset conditions are not satisfied, it may be set to use the quadtree split. As a specific example, in relation to the coding unit across the outline of the image, the conditions 3 and 4 may be changed as shown in Table 13.

TABLE 13

```
    //(3. Test for binary split in horizontal direction)
    if(height == 64 && width > 64)
    QT is used
    else
    BT in horizontal direction may be used // There may be
additional conditions to determine whether a binary split in
a horizontal direction is allowed.
    //(4. Test for binary split in vertical direction)
    if(height > 64 && width == 64)
    QT is used
    else
    BT in vertical direction may be used // There may be
additional conditions to determine whether a binary split in
a vertical direction is allowed.
    // End of Table 13
```

For reference, splits of a coding unit across the outline of the image and a coding unit not across the outline of the image are as follows. With respect to the coding unit across the outline of the image, it may be considered as whether or not to use a split mode, and with respect to the coding unit not across the outline of the image, it may be considered as whether or not to allow a split mode. In another embodiment, when a current coding unit is determined by performing a binary split on a coding unit of an upper depth, following the binary split, a quadtree split may not be allowed for the current coding unit, and a binary split of the current coding unit in the same direction may also be restricted. As an exception, a quadtree split may be allowed for a non-square coding unit. Also, when a coding unit is already binary split in another direction because a binary split in a specific direction is difficult to perform, splitting may be performed in a direction different from a split direction of the previously performed binary split. That is, when a binary split in a vertical direction is already performed because a binary split in a horizontal direction is impossible, the binary split in the horizontal direction may be subsequently allowed. It may be expressed in terms of pseudo codes as shown in Table 14.

TABLE 14

```
    //(3. Test for binary split in horizontal direction)
    if(height == 64 && width > 64)
    BT in vertical direction is used
    else
    BT in horizontal direction may be used // There may be
additional conditions to determine whether a binary split in
a horizontal direction is allowed.
    //(4. Test for binary split in vertical direction)
    if(height > 64 && width == 64)
    BT in horizontal direction is used
    else
    BT in vertical direction may be used // There may be
additional conditions to determine whether a binary split in
a vertical direction is allowed.
    // End of Table 14
```

In another embodiment, conditions 3 and 4 may be modified as shown in Table 15.

TABLE 15

```
    //(3. Test for binary split in horizontal direction)
    if(width != height && width > 64)
    QT is used
    else
    BT in horizontal direction may be used // There may be
additional conditions to determine whether a binary split in
a horizontal direction is allowed.
```

TABLE 15-continued

```
//(4. Test for binary split in vertical direction)
if(width != height && width == 64)
QT is used
else
BT in vertical direction may be used // There may be
additional conditions to determine whether a binary split in
a vertical direction is allowed.
// End of Table 15
```

In another embodiment, a binary split may be allowed for a non-square coding unit as shown in Table 16.

TABLE 16

```
//(3. Test for binary split in horizontal direction)
if(width != height && width > 64)
BT in vertical is used
else
BT in horizontal direction may be used // There may be
additional conditions to determine whether a binary split in
a horizontal direction is allowed.
    //(4. Test for binary split in vertical direction)
    if(width != height && width == 64)
    BT in horizontal is used
    else
    BT in vertical direction may be used // There may be
additional conditions to determine whether a binary split
in a vertical direction is allowed.//
    // End of Table 16
```

The above-described specific conditions for various splitting methods may be used together with various conditions for determining the split modes. Also, when the largest coding unit includes the outline of the image, the largest coding unit is arbitrarily split once using a quadtree split, and a splitting method according to split information may be applied to coding units generated by the quadtree split. As an example, when a size of the largest coding unit is 128×128 and the maximum transform size is 64, the largest coding unit is arbitrarily split into four 64×64-sized coding units, and then a splitting method according split information based on a split mode may be performed on the 64×64-sized coding units.

TABLE 17

```
if(width > 64 && height > 64)
QT split is used
// End of Table 17
```

As another example, when the largest coding unit includes a right outline of the image, the largest coding unit is vertically binary split once, and when an additional split is required for coding units generated by the vertical binary split, only a horizontal binary split may be allowed. Similarly, when the largest coding unit includes a lower outline of the image, the largest coding unit is horizontally binary split once, and when an additional split is required for coding units generated by the horizontal binary split, only a vertical binary split may be allowed.

According to an embodiment, when half or more than half of coding units located at the outline of the image are included in the image, an additional split may be allowed, in consideration of the number of pipeline modules allowed in terms of the pipeline structure. For example, under the assumption that the number of pipeline modules in a 128×128-sized coding unit is four, a case where the maximum transform size is 64 may be assumed. When an area of the coding unit having a size of 64×128 is located within the outline of the image, a binary split in a vertical direction may be allowed so as to allow that two 32×128-sized coding units are to be generated. In this regard, an additional binary split of the generated coding units in a vertical direction may not be allowed.

Hereinbelow, an SPS is modified based on a working draft 2.0 of a versatile video coding (WC) standard, so that information about sizes of blocks restricted in various split modes may be signaled.

FIG. 30 illustrates a syntax signaled through an SPS, according to an embodiment. According to an embodiment, the video encoding apparatus 1700 may encode the information n about the sizes of the blocks restricted in various split modes and include the encoded information in the SPS of FIG. 30. According to an embodiment, the video decoding apparatus 1900 may obtain, from the SPS of FIG. 30, the information about the sizes of the blocks restricted in various split modes.

Through the SPS (seq_parameter_set_rbsp( )), information (log 2_diff_ctu_max_bt_size_intra, log 2_diff_ctu_max_bt_size_inter) about a maximum size of a binary splittable coding unit and information (log 2_diff_ctu_max_bt_size_intra, log 2_diff_ctu_max_bt_size_inter) about a difference between a maximum size and a minimum size of a binary splittable coding unit may be signaled by intra type and inter type. Also, information (log 2_diff_ctu_max_tt_size_intra, log 2_diff_ctu_max_tt_size_inter) about a maximum size of a ternary splittable coding unit and information (log 2_diff_ctu_max_tt_size_intra, log 2_diff_ctu_max_tt_size_inter) about a difference between a maximum size and a minimum size of a ternary splittable coding unit may be signaled through the SPS by intra slice and inter slice.

Moreover, information (qtbtt_dual_tree_inter_flag) indicating whether a split mode is separately determined for a luma block and a chroma block may be signaled through the SPS. When qtbtt_dual_tree_inter_flag indicates that the split mode is separately determined for the luma block and the chroma block, information (log 2_diff_ctu_max_bt_size_chroma_intra, log 2_diff_ctu_max_bt_size_chroma_inter) about a difference between a maximum size and a minimum size of a binary splittable chroma coding unit may be signaled through the SPS by intra slice and inter slice. Also, information (log 2_diff_ctu_max_tt_size_chroma_intra, log 2_diff_ctu_max_tt_size_chroma_inter) about a difference between a maximum size and a minimum size of a ternary splittable chroma coding unit may be signaled through the SPS by intra slice and inter slice.

Instead of the embodiment provided in FIG. 30, in which the information about the maximum size of the binary splittable or ternary splittable coding unit is signaled, information about a minimum size of the binary splittable coding unit and information about a minimum size of the ternary splittable coding unit may be signaled.

In another embodiment, signaling of information about a size of a binary splittable/ternary splittable coding unit may not be performed by binary split and ternary split, but may be performed with a common parameter.

Also, a value additionally set for each slice may be updated and signaled at a slice header level.

The disclosure has been particularly shown and described with reference to embodiments thereof. In this regard, it will be understood by one of ordinary skill in the art that various changes in form and details may be made therein without departing from the scope of the disclosure. Therefore, the embodiments should be considered in a descriptive sense only and not for purposes of limitation. The scope of the disclosure is defined not by the detailed descriptions of the disclosure but by the following claims, and all differences within the scope will be construed as being included in the disclosure.

Meanwhile, the aforedescribed embodiments of the disclosure may be written as a program executable on a computer, and may be implemented in general-use digital computers that execute the program by using a computer-readable recording medium. Examples of the computer-readable storage medium include magnetic storage media (e.g., ROM, floppy disks, hard disks, etc.), optical storage media (e.g., CD-ROMs, or DVDs), or the like.

The invention claimed is:

1. A video decoding method comprising:
   identifying that a right boundary of a first coding unit is outside of a right boundary of an image;
   based on a height of the first coding unit being greater than a maximum transform size and a width of the first coding unit being greater than the maximum transform size, determining that a vertical binary split of the first coding unit is allowed;
   based on the determining that the vertical binary split of the first coding unit is allowed, determining second coding units by splitting the width of the first coding unit in half in a vertical direction and decoding the second coding units;
   based on the height of the first coding unit being greater than the maximum transform size and the width of the first coding unit being equal to the maximum transform size, determining that the vertical binary split of the first coding unit is not allowed and a horizontal binary split of the first coding unit is allowed; and
   based on the determining that the vertical binary split of the first coding unit being not allowed and the horizontal binary split of the first coding unit being allowed, determining third coding units by splitting the height of the first coding unit in half in a horizontal direction and decoding the third coding units.

2. A video decoding apparatus comprising:
   a processor configured to:
   when a right boundary of a first coding unit is outside of a right boundary of an image and both of a height of the first coding unit and a width of the first coding unit is greater than a maximum transform size, determine that a vertical binary split of the first coding unit is allowed,
   when the vertical binary split of the first coding unit is allowed, determine second coding units by splitting the width of the first coding unit in half in a vertical direction and decode the second coding units,
   when the right boundary of the first coding unit is outside of the right boundary of the image, the height of the first coding unit is greater than the maximum transform size and the width of the first coding unit is equal to the maximum transform size, determine that the vertical binary split of the first coding unit is not allowed and a horizontal binary split of the first coding unit is allowed, and
   when the vertical binary split of the first coding unit is not allowed and the horizontal binary split of the first coding unit is allowed, determine third coding units by splitting the height of the first coding unit in half in a horizontal direction and decoding the third coding units; and
   a memory configured to store data generated from the processor.

3. A video encoding method comprising:
   identifying that a right boundary of a first coding unit is outside of a right boundary of an image;
   based on a height of the first coding unit being greater than a maximum transform size and a width of the first coding unit being greater than the maximum transform size, determining that a vertical binary split of the first coding unit is allowed;
   based on the determining that the vertical binary split of the first coding unit is allowed, determining second coding units by splitting the width of the first coding unit in half in a vertical direction and encoding the second coding units;
   based on the height of the first coding unit being greater than the maximum transform size and the width of the first coding unit being equal to the maximum transform size, determining that the vertical binary split of the first coding unit is not allowed and a horizontal binary split of the first coding unit is allowed;
   based on the determining that the vertical binary split of the first coding unit is not allowed and the horizontal binary split of the first coding unit is allowed, determining third coding units by splitting the height of the first coding unit in half in a horizontal direction and encoding the third coding units.

\* \* \* \* \*